(12) United States Patent
Lonergan, III et al.

(10) Patent No.: US 8,382,595 B2
(45) Date of Patent: Feb. 26, 2013

(54) TORQUE LIMITING DRIVELINE

(75) Inventors: Joseph W. Lonergan, III, Allentown, PA (US); Luther Gates, Honey Brook, PA (US)

(73) Assignee: Neapco LLC, Pottstown, PA (US)

( * ) Notice: Subject to any disclaimer, the term of this patent is extended or adjusted under 35 U.S.C. 154(b) by 146 days.

(21) Appl. No.: 12/815,271

(22) Filed: Jun. 14, 2010

(65) Prior Publication Data
US 2011/0024253 A1 Feb. 3, 2011

Related U.S. Application Data

(60) Provisional application No. 61/187,142, filed on Jun. 15, 2009.

(51) Int. Cl.
*F16D 7/04* (2006.01)

(52) U.S. Cl. .......................................... 464/38; 464/906

(58) Field of Classification Search .............. 464/37–39, 464/42–44, 146, 906
See application file for complete search history.

(56) References Cited

U.S. PATENT DOCUMENTS

| | | | |
|---|---|---|---|
| 2,743,637 A | 5/1956 | Redmon | |
| 3,942,337 A * | 3/1976 | Leonard et al. | |
| 4,062,203 A * | 12/1977 | Leonard et al. | 464/38 |
| 5,005,684 A | 4/1991 | Fujii | |
| 5,035,311 A * | 7/1991 | Girguis | 464/38 X |
| 5,643,089 A | 7/1997 | Hummel | |
| 5,913,633 A | 6/1999 | Shimizu et al. | |
| 6,132,435 A * | 10/2000 | Young | |
| 6,299,538 B1 * | 10/2001 | Gassmann | 464/42 X |
| 6,623,395 B2 * | 9/2003 | Lovatt | |
| 6,626,139 B1 * | 9/2003 | Horita et al. | |
| 6,993,989 B2 * | 2/2006 | Oomura et al. | |
| 8,062,137 B2 * | 11/2011 | Arden et al. | 464/906 |
| 2005/0217960 A1 | 10/2005 | Kuissi et al. | |

FOREIGN PATENT DOCUMENTS

| | | |
|---|---|---|
| DE | 12 11 874 B | 3/1966 |
| DE | 1 575 735 A1 | 1/1970 |
| DE | 32 30 817 A1 | 2/1984 |
| DE | 297 13 253 U1 | 11/1998 |
| DE | 199 09 301 A1 | 9/2000 |
| EP | 1 764 525 A1 | 3/2007 |

(Continued)

OTHER PUBLICATIONS

International Preliminary Report on Patentability for Application No. PCT/US2010/038540, dated Dec. 16, 2011.
International Search Report and Written Opinion for Application No. PCT/US2010/038540, dated Dec. 27, 2010.

*Primary Examiner* — Gregory Binda
*Assistant Examiner* — Josh Skroupa
(74) *Attorney, Agent, or Firm* — Marshall, Gerstein & Borun LLP

(57) ABSTRACT

A torque-limiting device assembly is provided that includes a bell having a top wall and a circumferential side wall defining a bell interior. A plurality of radially-arrayed engagement grooves are formed on an inner surface of the top wall. A clutch stub shaft having a stem and a plurality of engagement protrusions formed on a clutch flange is disposed within the bell interior. A resilient member is secured to the bell, and the resilient member biases the clutch stub shaft towards the top wall of the bell such that the engagement grooves frictionally engage the engagement protrusions to transfer torque from the stem to the bell when the stem is rotated. An input torque applied to the stem that is greater than a predetermined input torque causes the engagement protrusions to disengage from the engagement grooves such that the input torque is not transferred from the stem to the bell.

14 Claims, 14 Drawing Sheets

FOREIGN PATENT DOCUMENTS

| | | |
|---|---|---|
| FR | 2 349 383 A1 | 11/1977 |
| FR | 2 627 443 A1 | 8/1989 |
| FR | 2627443 * | 8/1989 |
| GB | 933 614 A | 8/1963 |
| GB | 2 018 368 A | 10/1979 |
| GB | 2 312 723 A | 11/1997 |
| JP | 4-171319 A | 6/1992 |
| WO | WO-94/12801 A1 | 6/1994 |

* cited by examiner

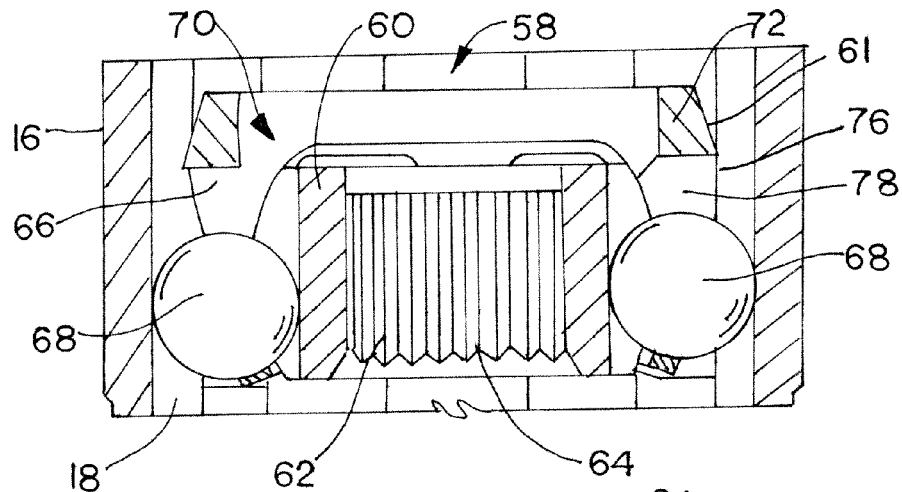
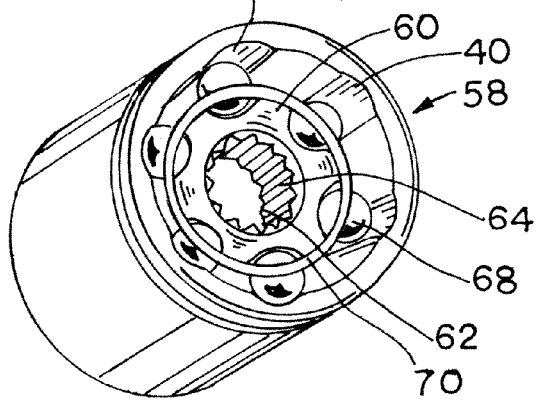
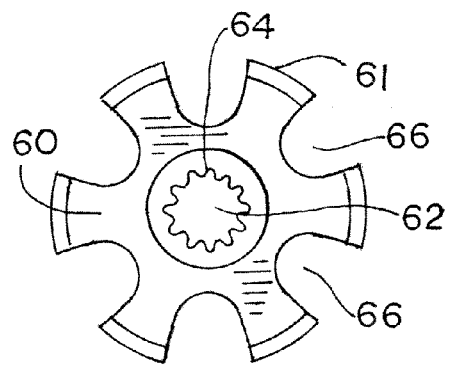
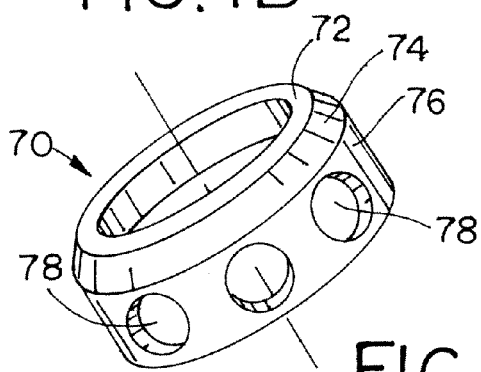
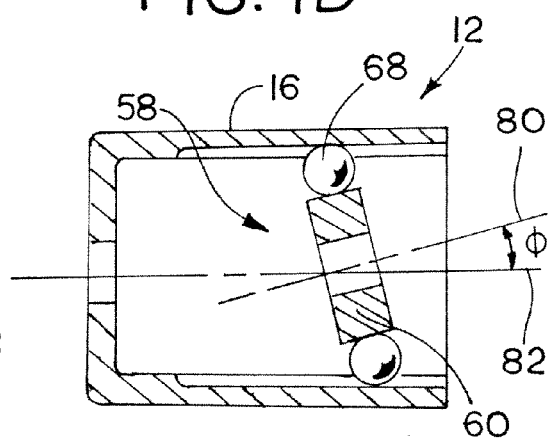

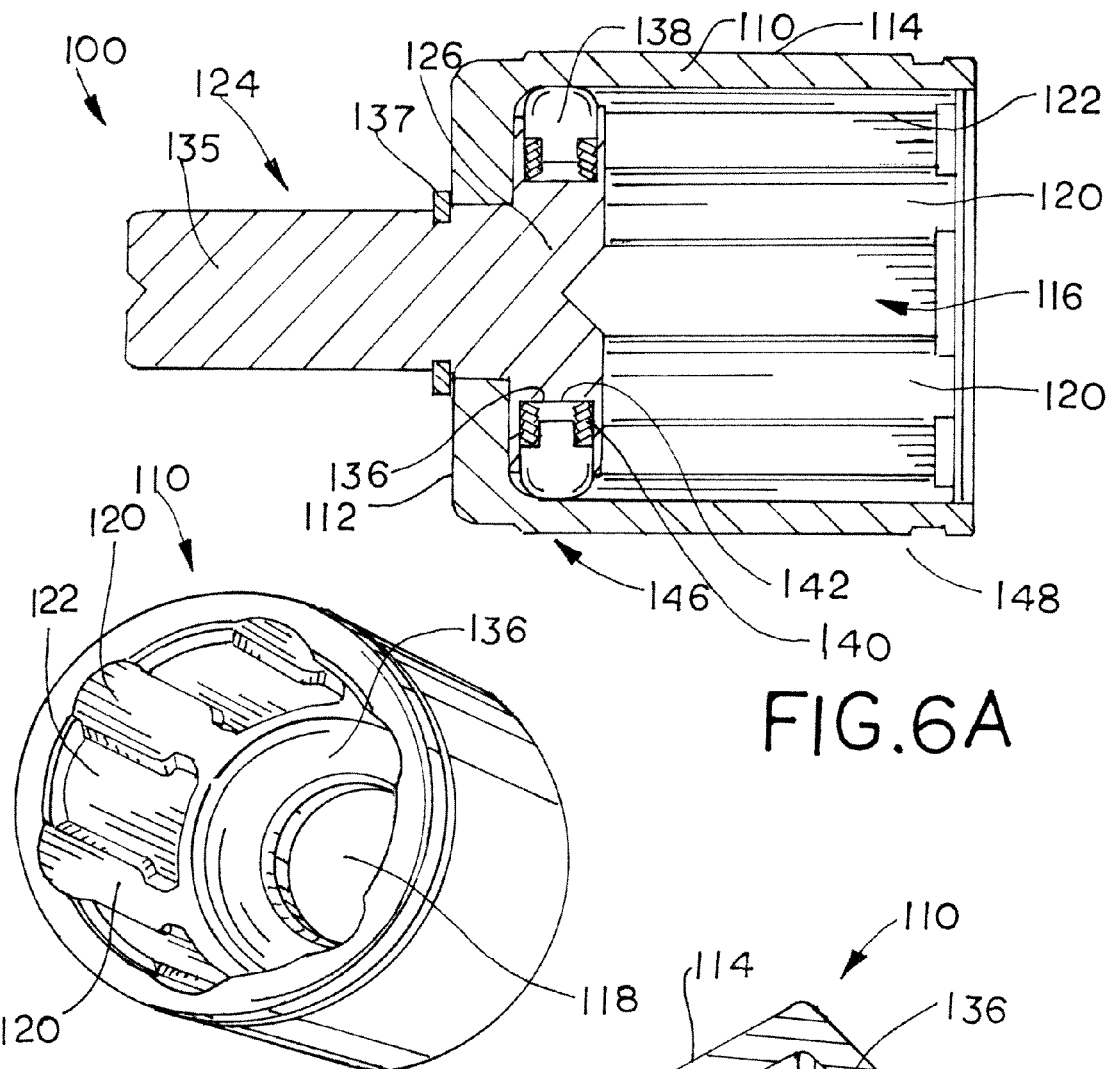
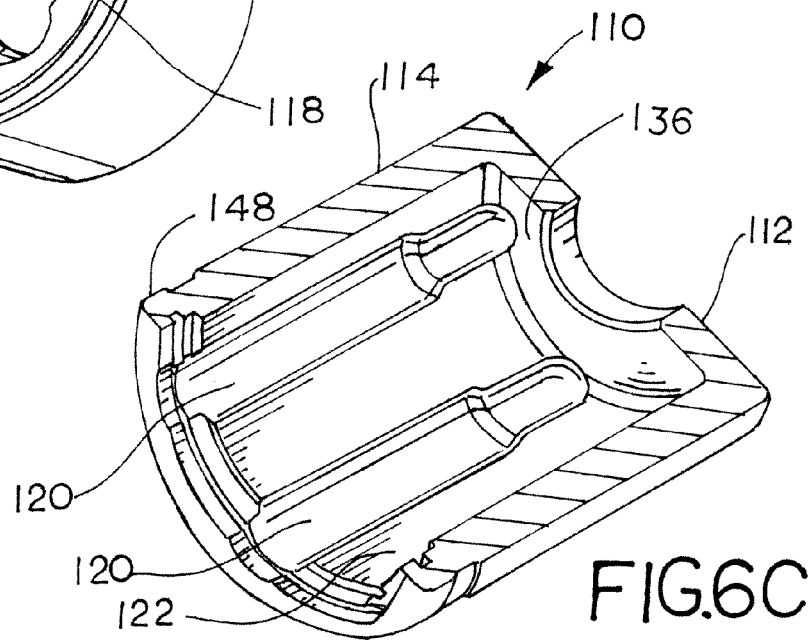
FIG.6A
FIG.6B
FIG.6C

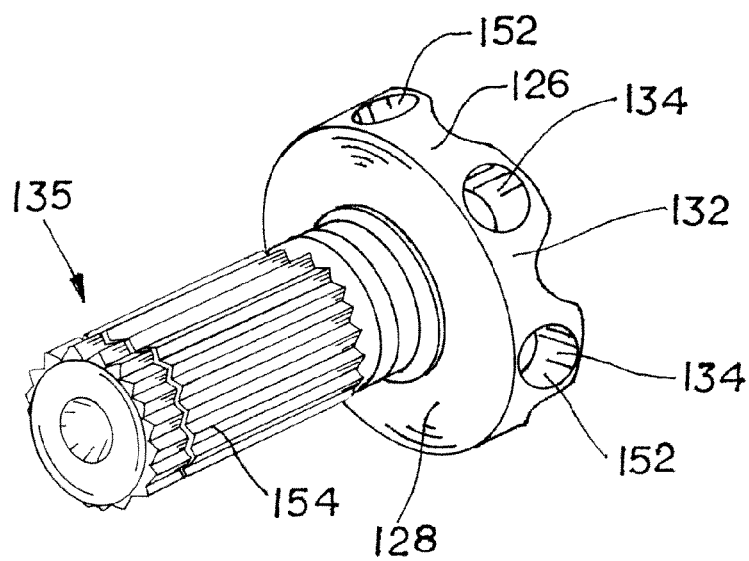
FIG. 7A
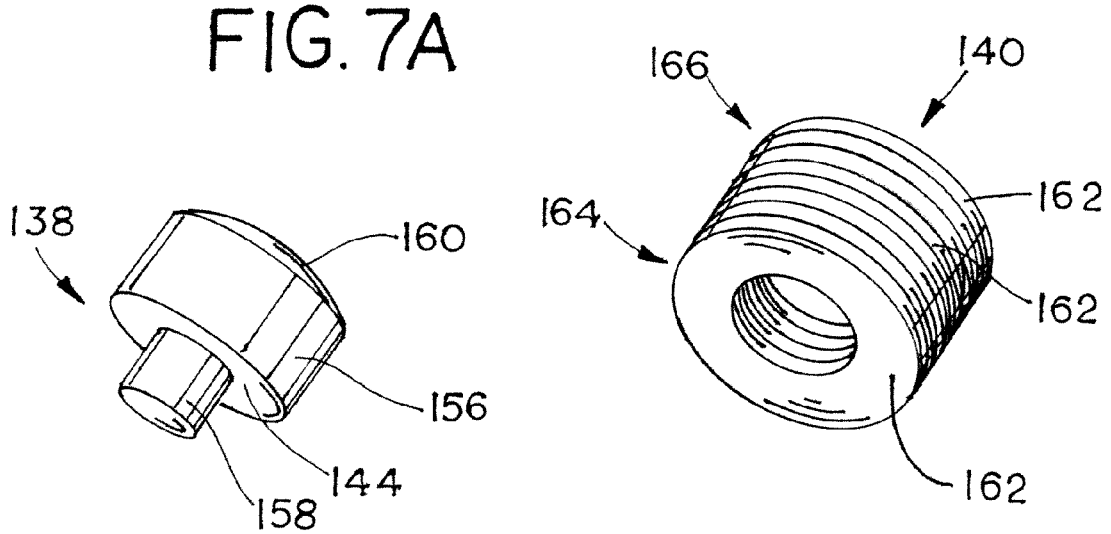
FIG. 7B
FIG. 7C

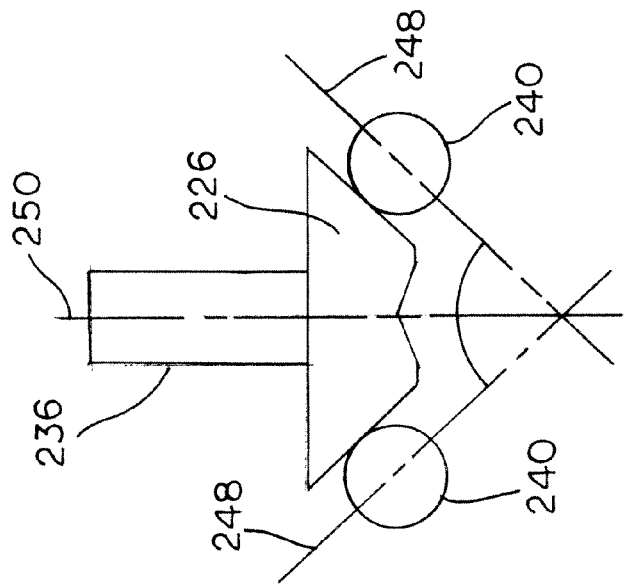
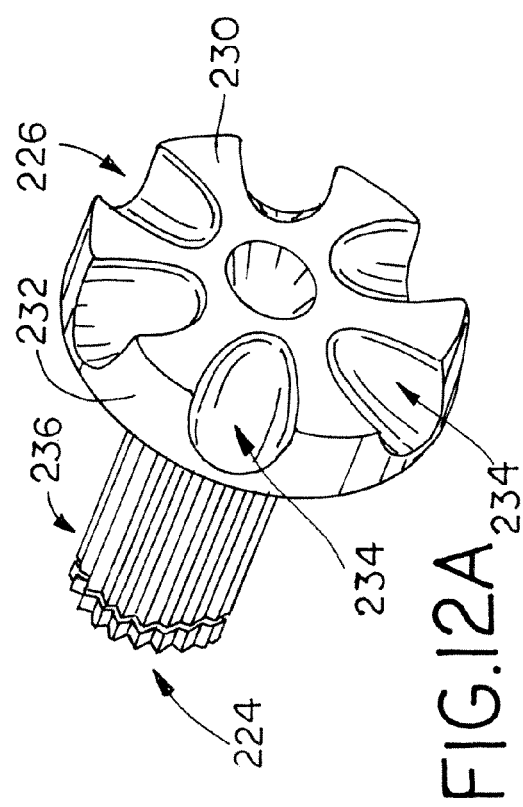
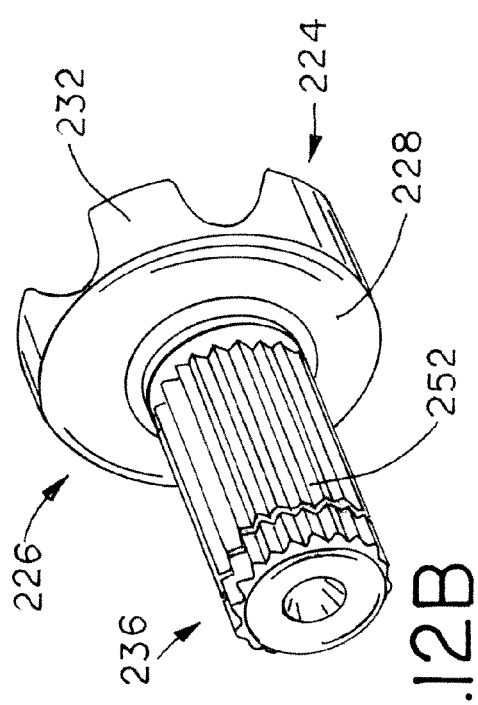

TORQUE LIMITING DRIVELINE

FIELD OF THE DISCLOSURE

This disclosure relates generally to rotational couplings, and, more particularly, to rotational couplings that limit torque transmission.

BACKGROUND OF THE INVENTION

Vehicles, such as automobiles and All Terrain Vehicles (ATVs), are generally powered by an internal combustion engine, and the energy generated by the engine is translated into vehicle movement by a drivetrain (also known as a powertrain). The drivetrain generally includes a transmission coupled to the engine, a driveshaft that is coupled to the transmission, and a mechanism coupled to the driveshaft to rotate the wheels of the vehicle. The drivetrain therefore transfers torque generated by the engine to the wheels of the vehicle via the driveshaft, and the torque transferred by the driveshaft subjects the driveshaft to shearing stress. The greater the torque transferred by the driveshaft, the greater the shearing stress within the driveshaft. When a relatively large amount of torque is transferred by the driveshaft, such as when the vehicle tows a heavy load, the shearing stress could reach a critical value resulting in the failure of the driveshaft. This failure could result in the driveshaft shearing into two or more pieces, which could lead to extensive damage to the vehicle that is costly to repair. Additionally, the vehicle operator could be seriously injured by fragments of the sheared driveshaft or by losing control of the vehicle.

In addition to torsional stress, the driveshaft is also subjected to bending stresses. The driveshaft is an elongated cylindrical rod fixed at its far ends, and any bending of the driveshaft normal to its longitudinal axis leads to tensile and compressive stresses within the driveshaft. Such bending of the driveshaft may occur when the vehicle is operated on uneven surfaces, or when the driveshaft contacts rocks or other objects when operating the vehicle over rugged terrain. These bending stresses can also lead to the failure of the driveshaft, resulting in costly repair and/or injury to the operator.

Therefore, there exists a need for a rotational coupling that will not transfer a torque that is over a predetermined maximum value, while also allowing for longitudinal flexibility to reduce bending stresses within the driveshaft.

BRIEF SUMMARY OF THE INVENTION

In accordance with one exemplary aspect of the present invention, a torque-limiting device assembly may include a bell having a top wall and a circumferential side wall defining a bell interior. A stem aperture may be formed in the top wall and a plurality of first engagement features may be formed on an inner surface of the top wall. The torque-limiting device assembly may also include a clutch stub shaft including a clutch flange having a top surface, and the top surface may include a plurality of second engagement features. A stem may axially extend from the top surface of the clutch flange, and the stem may be adapted to engage a shaft. The clutch stub shaft may be sized to be received into the bell interior such that the stem extends through the stem aperture of the top wall of the bell, and the inner surface of the top wall of the bell may be proximate to the top surface of the clutch flange. A resilient member may be secured to the bell, and the resilient member may bias the top surface of the clutch stub shaft towards the top wall of the bell such that the first engagement features of the bell frictionally engage the second engagement features of the clutch stub shaft. A first input torque applied to the stem that is less than a predetermined input torque may be transferred to the bell when the first engagement features of the bell frictionally engage the second engagement features of the stem clutch. A second input torque applied to the stem that is greater than the predetermined input torque may cause the second engagement features of the stem clutch to disengage with the first engagement features of the bell such that the second input torque is not transferred to the bell.

In accordance with another exemplary aspect of the present invention, the first engagement features may be a plurality of radially-disposed slots formed on the inner surface of the top wall of the bell. The second engagement features may be a plurality of radially-disposed ridges formed on the top surface of the clutch flange, and each of the plurality of ridges may be configured to be received into one of the plurality of slots.

In accordance with still another exemplary aspect of the present invention, the first engagement features may be a plurality of radially disposed ridges formed on the inner surface of the top wall of the bell. The second engagement features may be a plurality of radially-disposed slots formed on the top surface of the clutch flange, and each of the plurality of ridges is configured to be received into one of the plurality of slots.

In accordance with yet another exemplary aspect of the present invention, the first engagement features may be a plurality of radially-disposed dome depressions formed on the inner surface of the top wall of the bell. The second engagement features may be a plurality of radially-disposed dome projections formed on the top surface of the clutch flange, and each of the plurality of dome projections may be configured to be received into one of the plurality of dome depressions.

In accordance with yet one more exemplary aspect of the present invention, the first engagement features may be a plurality of radially disposed dome projections formed on the inner surface of the top wall of the bell. The second engagement features may be a plurality of radially-disposed dome depressions formed on the top surface of the clutch flange, and each of the plurality of dome projections may be configured to be received into one of the plurality of dome depressions.

In accordance with another exemplary aspect of the present invention, the resilient member may be a Belleville spring. The Belleville spring may be coupled to the bell by a retainer ring that may be disposed in a circumferential slot formed on an interior surface of the bell. The resilient member may also be a wave spring.

In accordance with still another exemplary aspect of the present invention, a plurality of longitudinal slots may be formed on an interior surface of the bell.

In accordance with one more exemplary aspect of the present invention, a flexible coupling assembly may include an annular shaft hub having a shaft aperture and a plurality of ball windows radially disposed about a longitudinal axis of the shaft hub. The flexible coupling assembly may also include a plurality of balls, each of the balls being disposed within a corresponding ball window formed in the shaft hub. The flexible coupling assembly may further include a ball retainer coupled to the shaft hub, the ball retainer securing each of the plurality of balls within the corresponding ball window of the shaft hub. Each of the plurality of balls may be slidingly disposed in one of the plurality of longitudinal slots formed in the interior surface of the bell such that the flexible coupling assembly may be longitudinally displaceable relative to the bell and such that the longitudinal axis of the shaft hub may be angularly displaceable relative to a longitudinal axis of the bell.

In accordance with yet another exemplary aspect of the present invention, the interior surface of the side wall of the bell may have a circular cross-sectional shape, and the clutch flange may have a circular cross sectional shape.

In accordance with a further exemplary aspect of the present invention, the stem may be cylindrical. Additionally, the stem may be splined.

In accordance with another exemplary aspect of the present invention, a torque-limiting device assembly may include a bell having a top wall and a circumferential side wall defining a bell interior. A stem aperture may be formed in the top wall and a plurality of longitudinally-disposed slots may be formed on an inner surface of the side wall. The torque-limiting device assembly may also include a clutch stub shaft including a clutch hub having a top surface and a circumferential side surface, and the circumferential side surface may have a plurality of radially disposed pin recesses. A stem may axially extend from the top surface of the clutch hub, and the stem may be adapted to engage a shaft. A plurality of radial pins may be disposed in the plurality of pin recesses, and each of the radial pins may have an engagement surface. The torque-limiting device assembly may also include a plurality of resilient members. Each of the plurality of resilient members may be disposed between a surface of the pin recess and a surface of the radial pin such that each of the plurality of resilient members biases each of the plurality of radial pins into mating engagement with one of the plurality of slots formed on the interior surface of the side wall. A first input torque applied to the stem that is less than a predetermined input torque may be transferred to the bell when each of the plurality of resilient members biases each of the plurality of radial pins into mating engagement with one of the plurality of longitudinal slots formed on the interior surface of the side wall such that the clutch stub shaft does not rotate relative to the bell. A second input torque applied to the stem that is greater than the predetermined input torque causes each of the radial pins to disengage with each of the longitudinal slots such that the clutch stub shaft rotates relative to the bell.

In accordance with another exemplary aspect of the present invention, the resilient member may be a plurality of Belleville springs. The resilient member may also be a wave spring.

In accordance with one more exemplary aspect of the present invention, a flexible coupling assembly may include an annular shaft hub having a shaft aperture and a plurality of ball windows radially disposed about a longitudinal axis of the shaft hub. The flexible coupling assembly may also include a plurality of balls, each of the balls being disposed within a corresponding ball window formed in the shaft hub. The flexible coupling assembly may further include a ball retainer coupled to the shaft hub, the ball retainer securing each of the plurality of balls within the corresponding ball window of the shaft hub. Each of the plurality of balls may be slidingly disposed in one of the plurality of longitudinal slots formed in the interior surface of the bell such that the flexible coupling assembly may be longitudinally displaceable relative to the bell and such that the longitudinal axis of the shaft hub may be angularly displaceable relative to a longitudinal axis of the bell.

In accordance with yet another exemplary aspect of the present invention, the interior surface of the side wall of the bell may have a circular cross-sectional shape, and the clutch flange may have a circular cross sectional shape.

In accordance with a further exemplary aspect of the present invention, the stem may be cylindrical. Additionally, the stem may be splined.

In accordance with another exemplary aspect of the present invention, a torque-limiting device assembly may include a bell having a top wall and a circumferential side wall defining a bell interior. A stem aperture may be formed in the top wall and a plurality of longitudinally-disposed slots may be formed on an inner surface of the side wall. The torque-limiting device assembly may also include a clutch stub shaft including a clutch hub having a top surface and a circumferential side surface, and a plurality of radially disposed oblique channels may be formed in the clutch hub. A stem may axially extend from the top surface of the clutch hub, and the stem may be adapted to engage a shaft. The clutch stub shaft may be sized to be received into the bell such that the stem may extend through the stem aperture of the top wall of the bell and the inner surface of the top wall of the bell may be proximate to the top surface of the clutch hub. The torque-limiting device assembly may also include a plurality of clutch balls, and each of the plurality of clutch balls may be disposed in one of the plurality of oblique channels. Each of the clutch balls may be capable of radial displacement relative to the clutch hub such that as the ball is displaced toward a longitudinal axis of the clutch stub shaft, the ball also is displaced away from the top wall of the bell. The torque-limiting device assembly may further include a resilient member secured to the bell, and the resilient member may bias each of the plurality of balls into mating engagement with one of the plurality of longitudinal slots formed in the bell. A first input torque applied to the stem that is less than a predetermined input torque may be transferred to the bell when each of the plurality of clutch balls is in mating engagement with one of the plurality of longitudinal slots formed on the interior surface of the side wall such that the clutch stub shaft does not rotate relative to the bell. A second input torque applied to the stem that is greater than the predetermined input torque may cause the plurality of clutch balls to disengage from the plurality of slots, thereby allowing the clutch stub shaft to rotate relative to the bell.

In accordance with yet another exemplary aspect of the present invention, the plurality of clutch balls may disengage from the plurality of slots when each of the clutch balls translate within the oblique channel towards a longitudinal axis of the clutch stub shaft such that each of the plurality of balls is not in mating engagement with one of the plurality of longitudinal slots.

In accordance with another exemplary aspect of the present invention, the resilient member may be a Belleville spring. The Belleville spring may be coupled to the bell by a retainer ring that may be disposed in a circumferential slot formed on an interior surface of the bell. The resilient member may also be a wave spring.

In accordance with still another exemplary aspect of the present invention, a retaining plate may be disposed between the Belleville spring and each of the plurality of clutch balls such that the Belleville spring biases a bottom surface of the retaining plate towards the top wall of the bell, and the top surface of the retaining plate engages each of the plurality of clutch balls.

In accordance with one more exemplary aspect of the present invention, a flexible coupling assembly may include an annular shaft hub having a shaft aperture and a plurality of ball windows radially disposed about a longitudinal axis of the shaft hub. The flexible coupling assembly may also include a plurality of balls, each of the balls being disposed within a corresponding ball window formed in the shaft hub.

The flexible coupling assembly may further include a ball retainer coupled to the shaft hub, the ball retainer securing each of the plurality of balls within the corresponding ball window of the shaft hub. Each of the plurality of balls may be slidingly disposed in one of the plurality of longitudinal slots formed in the interior surface of the bell such that the flexible coupling assembly may be longitudinally displaceable relative to the bell and such that the longitudinal axis of the shaft hub may be angularly displaceable relative to a longitudinal axis of the bell.

In accordance with yet another exemplary aspect of the present invention, the interior surface of the side wall of the bell may have a circular cross-sectional shape, and the clutch flange may have a circular cross sectional shape.

In accordance with a further exemplary aspect of the present invention, the stem may be cylindrical. Additionally, the stem may be splined.

In accordance with another exemplary aspect of the present invention, a torque-limiting device assembly may include a bell having a top wall, a circumferential side wall, and a stem aperture formed in the top wall. An inner surface of the side wall and an inner surface of the top wall may at least partially define a bell interior. The torque-limiting device assembly may also include a clutch stub shaft including a clutch flange having a top surface. A stem may axially extend from the top surface of the clutch flange, and the stem may be adapted to engage a shaft. The clutch stub shaft may be sized to be received into the bell interior such that the stem may extend through the stem aperture of the top wall of the bell and the inner surface of the top wall of the bell may frictionally engage the top surface of the clutch flange. The torque-limiting device assembly may further include a resilient member secured to the bell, and the resilient member may be adapted to bias the top surface of the clutch stub shaft towards the inner surface of the of the top wall such that the inner surface of the top wall of the bell frictionally engages the top surface of the clutch flange. A first input torque applied to the stem that is less than a predetermined input torque may be transferred to the bell when the inner surface of the top wall of the bell frictionally engages the top surface of the clutch flange. A second input torque applied to the stem that is greater than the predetermined input torque may cause the top surface of the clutch flange to disengage with the inner surface of the top wall of the bell such that the second input torque is not transferred to the bell.

In accordance with yet another exemplary aspect of the present invention, a plurality of radially-disposed slots may be formed on the inner surface of the top wall of the bell, and a plurality of radially-disposed ridges may be formed on the top surface of the clutch flange. Each of the plurality of ridges may be configured to be received into one of the plurality of slots such that the plurality of ridges frictionally engages the plurality of slots.

In accordance with one more another exemplary aspect of the present invention, a plurality of radially-disposed ridges may be formed on the inner surface of the top wall of the bell, and a plurality of radially-disposed slots may be formed on the top surface of the clutch flange. Each of the plurality of ridges may be configured to be received into one of the plurality of slots such that the plurality of ridges frictionally engages the plurality of slots.

In accordance with still one more another exemplary aspect of the present invention, a plurality of radially-disposed dome depressions may be formed on the inner surface of the top wall of the bell, and a plurality of radially-disposed dome projections may be formed on the top surface of the clutch flange. Each of the plurality of dome projections may be configured to be received into one of the plurality of dome depressions such that the plurality of dome projections frictionally engages the plurality of dome depressions.

In accordance with another exemplary aspect of the present invention, the resilient member may be a Belleville spring. The Belleville spring may be coupled to the bell by a retainer ring that may be disposed in a circumferential slot formed on an interior surface of the bell. The resilient member may also be a wave spring.

In accordance with still another exemplary aspect of the present invention, a plurality of longitudinal slots may be formed on an interior surface of the bell.

In accordance with one more exemplary aspect of the present invention, a flexible coupling assembly may include an annular shaft hub having a shaft aperture and a plurality of ball windows radially disposed about a longitudinal axis of the shaft hub. The flexible coupling assembly may also include a plurality of balls, each of the balls being disposed within a corresponding ball window formed in the shaft hub. The flexible coupling assembly may further include a ball retainer coupled to the shaft hub, the ball retainer securing each of the plurality of balls within the corresponding ball window of the shaft hub. Each of the plurality of balls may be slidingly disposed in one of the plurality of longitudinal slots formed in the interior surface of the bell such that the flexible coupling assembly may be longitudinally displaceable relative to the bell and such that the longitudinal axis of the shaft hub may be angularly displaceable relative to a longitudinal axis of the bell.

In accordance with yet another exemplary aspect of the present invention, the interior surface of the side wall of the bell may have a circular cross-sectional shape, and the clutch flange may have a circular cross sectional shape.

In accordance with a further exemplary aspect of the present invention, the stem may be cylindrical. Additionally, the stem may be splined.

BRIEF DESCRIPTION OF THE DRAWINGS

FIG. 4A is a sectional side view of a flexible coupling assembly of the first embodiment of the torque-limiting device assembly;

FIG. 4B is a perspective view of the flexible coupling assembly of FIG. 4A;

FIG. 4C is a perspective view of a ball retainer of the flexible coupling assembly of FIG. 4A;

FIG. 4D is a top view of a shaft hub of the flexible coupling assembly of FIG. 4A;

FIG. 4E is a sectional side view of the flexible coupling assembly of FIG. 4A within the bell;

FIG. 6A is a sectional side view of a second embodiment of the torque-limiting device assembly;

FIG. 6B is a perspective view of a bell of the second embodiment of the torque-limiting device assembly;

FIG. 6C is a sectional perspective view of the bell of FIG. 6B;

FIG. 7A is a perspective view of a clutch hub and stem of the second embodiment of the torque-limiting device assembly;

FIG. 7B is a perspective view of a radial pin of the second embodiment of the torque-limiting device assembly;

FIG. 7C is a perspective view of a resilient member of the second embodiment of the torque-limiting device assembly;

FIG. 12A is a perspective view of a clutch stub shaft of the third embodiment of the torque-limiting device assembly;

FIG. 12B is a perspective view of the clutch stub shaft of FIG. 12A;

FIG. 12C is a sectional side view of the clutch stub shaft of FIG. 12A;

DETAILED DESCRIPTION OF THE INVENTION

Figure 1A:
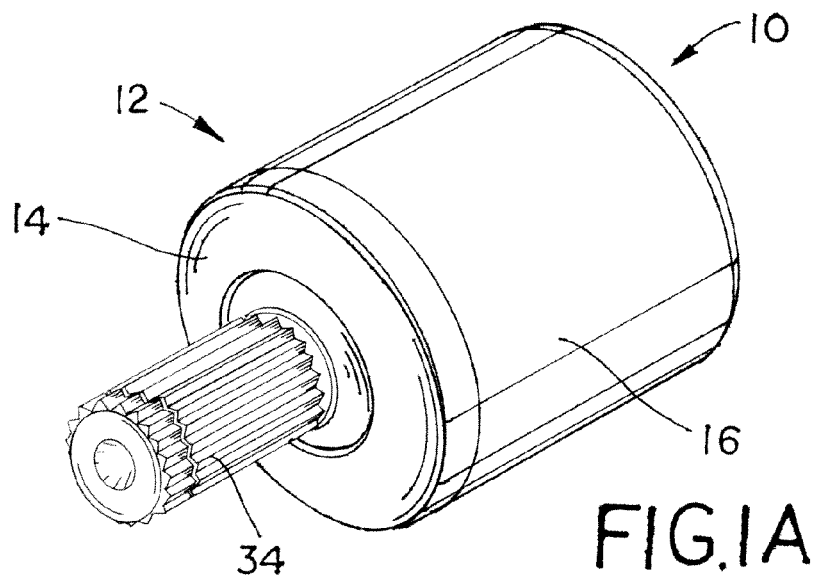
FIG. 1A is a perspective view of a first embodiment of the torque-limiting device assembly.

As illustrated in FIGS. 1A, 1B, 2A, 2B, 3A, and 3B, a torque-limiting device assembly 10 may include a bell 12 having a top wall 14 and a circumferential side wall 16 defining a bell interior 18. A stem aperture 20 may be formed in the top wall 14 and a plurality of first engagement features 22 may be formed on an inner surface 24 of the top wall 14. The torque-limiting device assembly 10 may also include a clutch stub shaft 26. The clutch stub shaft 26 may include a clutch flange 28 having a top surface 30, the top surface 30 including a plurality of second engagement features 32. A stem 34 may axially extend from the top surface 30 of the clutch flange 28. The clutch stub shaft 26 may be sized to be received into the bell interior 18 such that the stem 34 may extend through the stem aperture 20 of the top wall 14 of the bell 12 and the inner surface 24 of the top wall of the bell may be proximate to the top surface 30 of the clutch flange 28. A resilient member 36 may be secured to the bell 12, and the resilient member 36 may bias the top surface 30 of the clutch stub shaft 26 towards the top wall 24 of the bell 12 such that the first engagement features 22 of the bell frictionally engage the second engagement features 32 of the clutch stub shaft 26.

As shown in FIGS. 1A, 1B, 2A and 2B, and as explained above, the torque-device assembly 10 may include a bell 12. The bell 12 may be cylindrical in shape, and may include a top wall 14 located proximate to a first end 38 of the bell 12. The top wall 14 may be substantially planar, or may have the general shape of a dome. A stem aperture 20 may be located at the center of the top wall 14, and the aperture 20 may be dimensioned to receive a stem 34 of a clutch stub shaft 26. A plurality of first engagement features 22 may be formed on an inner surface 24 of the top wall 14. Each of the plurality of first engagement features 22 may be an engagement groove 44, and each engagement groove 44 may have a hemispherical cross-sectional shape when viewed along the length of the engagement groove 44, as illustrated in FIGS. 5A-5D. The engagement groove may also have a V-shaped cross-section when viewed along the length of the engagement groove 44. The plurality of engagement grooves 44 may be arranged in a radial array or any other suitable configuration. A circumferential side wall 16 may extend longitudinally from the periphery of the top wall 14, and the side wall 16 may define an open second end 46 of the bell 12 that is opposite the first end 38. A bell interior 18 may be partially defined by an inner surface 42 of the side wall 16 and the inner surface 24 of the top wall 14. A plurality of longitudinal slots 40 may be formed on the inner surface 42 of the side wall 16, and each of the plurality of longitudinal slots 40 may extend from a first point proximate to the first end 38 of the bell 12 to a point proximate to the second end of the bell 46.

As illustrated in FIGS. 1A, 1B, 3A and 3B, the torque-limiting device assembly 10 may also include a clutch stub shaft 26 at least partially disposed within the bell interior 18. As explained above, the clutch stub shaft 26 may include a clutch flange 28. The clutch flange 28 may have a generally circular shape, and an outer diameter of the clutch flange 20 may be less than the diameter of the cylindrical inner surface 42 of the bell 12. A plurality of second engagement features 32 may be formed on a top surface 30 of the clutch flange 28. Each of the plurality of second engagement features 32 may be an engagement protrusion 48, as illustrated in FIGS. 5A to 5D. Each engagement protrusion 48 may have a hemispherical cross-sectional shape when viewed along the length of the engagement protrusion 48. However, the engagement protrusion 48 may have any cross-sectional shape that allows the engagement protrusion 48 to frictionally engage the engagement groove 44, such as a V-shape cross-section. The engagement protrusion 48 may be dimensioned such that when the engagement protrusion 48 is longitudinally aligned with the engagement groove 44, the engagement protrusion 48 may be received into the engagement groove 44. The plurality of engagement protrusions 48 may be arranged in a radial array that substantially corresponds to the radial array of the engagement grooves 44 on the top wall 14 of the bell 12. However, the plurality of engagement protrusions 48 may be configured in any orientation that allows each of the plurality of engagement protrusions 48 to be received into one of the plurality of engagement grooves 44. A stem 34 may axially extend from the top surface 30 of the clutch flange 28. The stein 34 may have a splined exterior surface 50 that is adapted to be rotationally coupled to an input shaft. Alternatively, the stem may be keyed or otherwise adapted to be rotationally coupled to an input shaft.

Figure 1B:
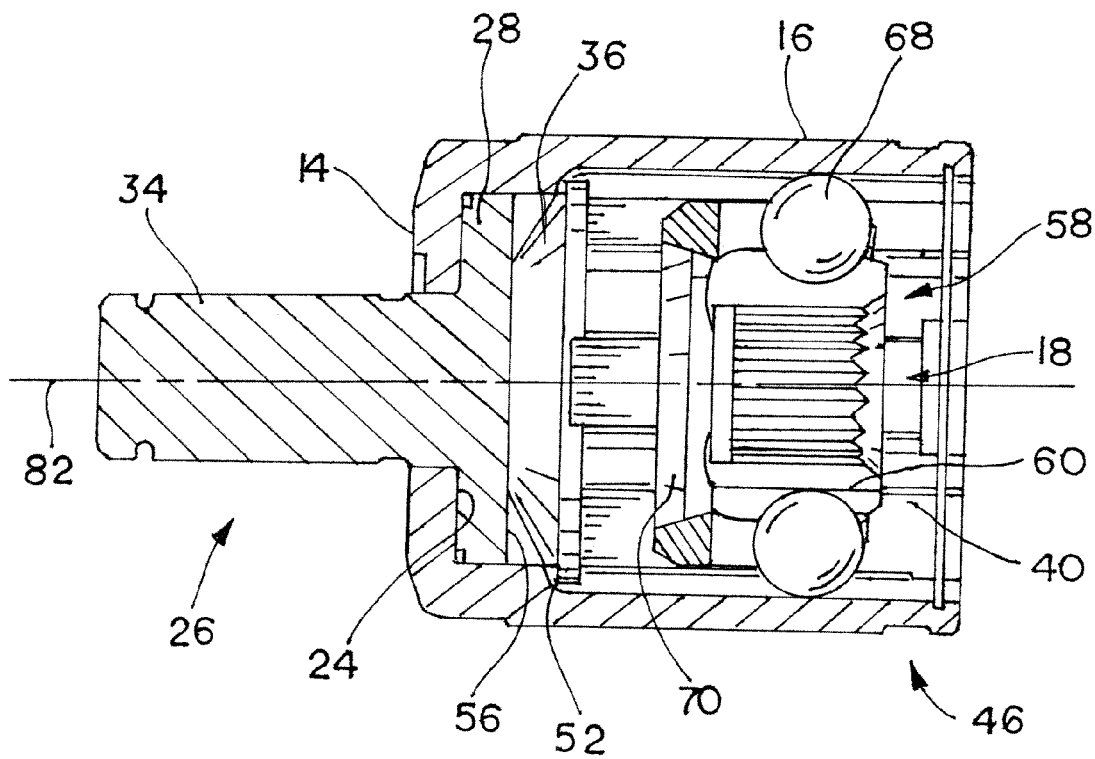
FIG. 1B is a sectional side view of the first embodiment of the torque-limiting device assembly.
Figure 2A:
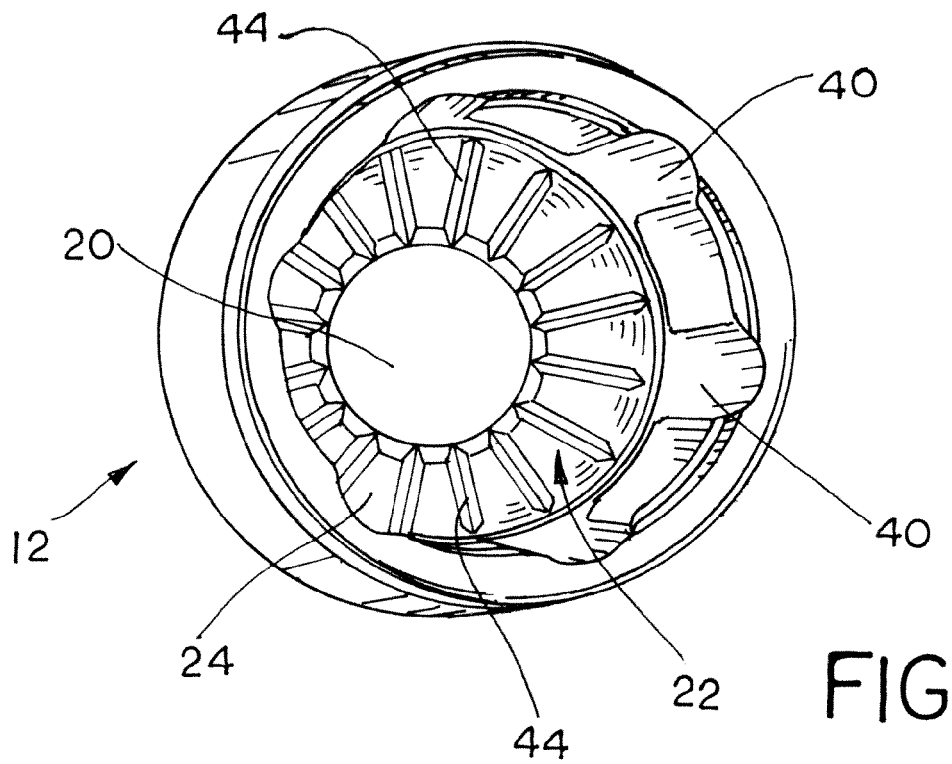
FIG. 2A is a perspective view of a bell of the first embodiment of the torque-limiting device assembly.
Figure 2B:
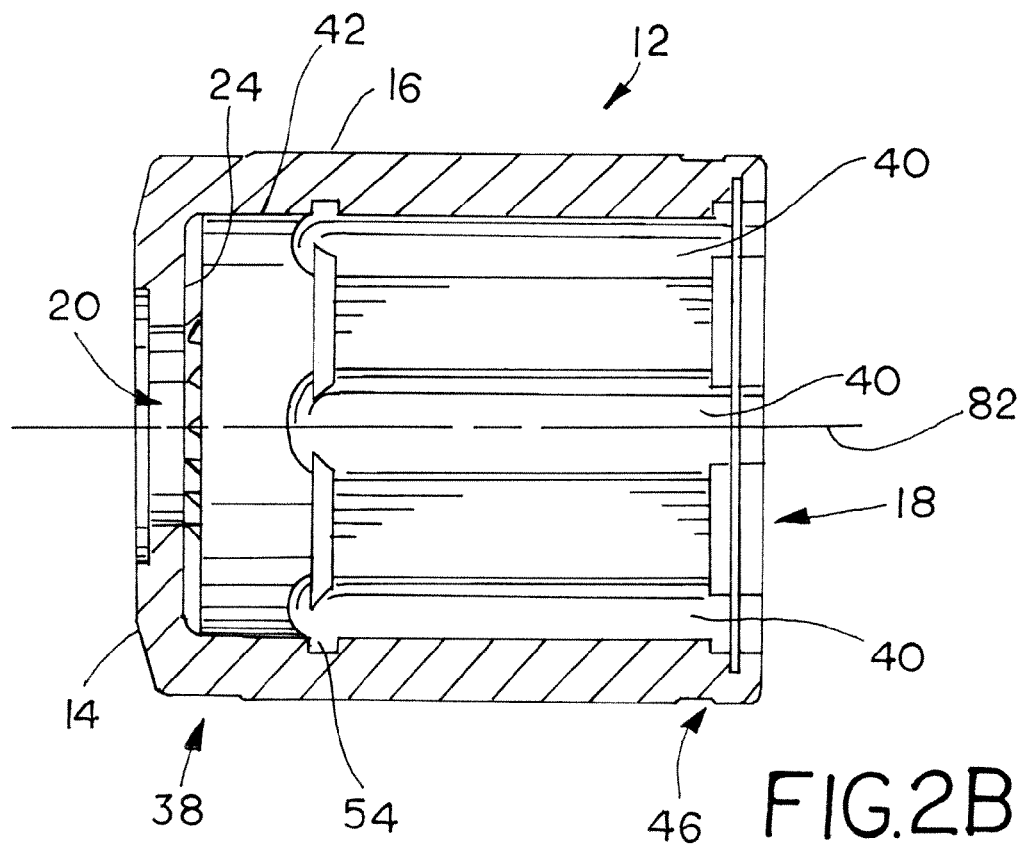
FIG. 2B is a sectional side view of a bell of FIG. 2A.
Figure 3A:
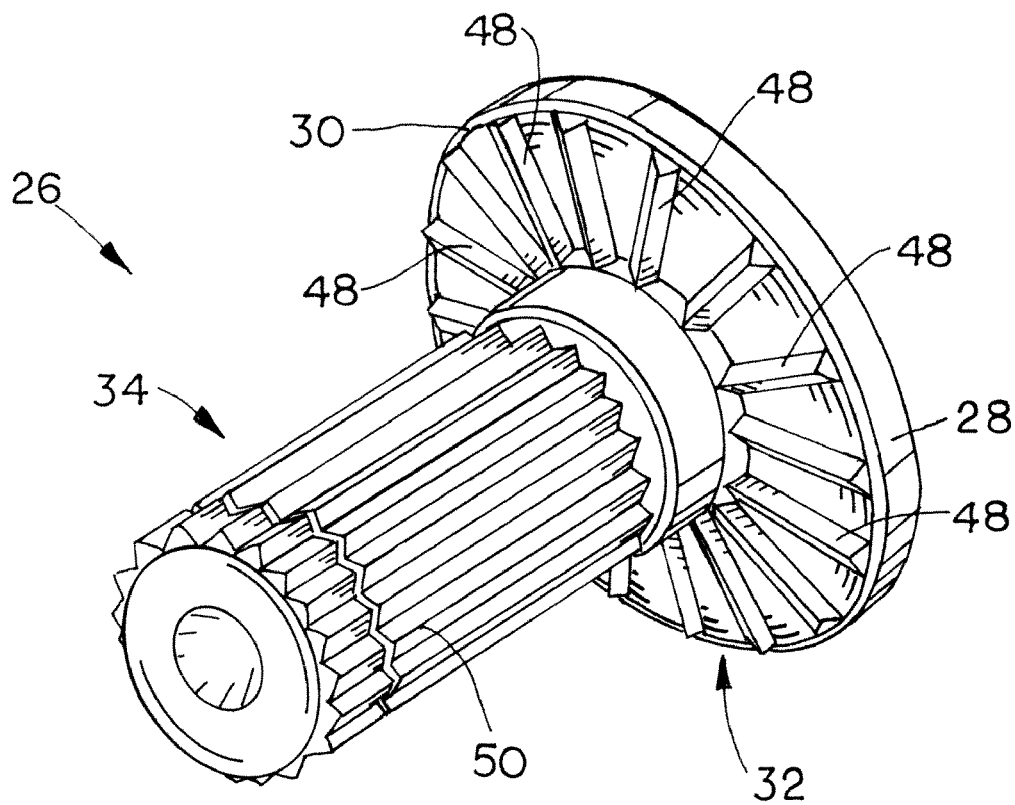
FIG. 3A is a perspective view of a clutch stub shaft of the first embodiment of the torque-limiting device assembly.
Figure 3B:
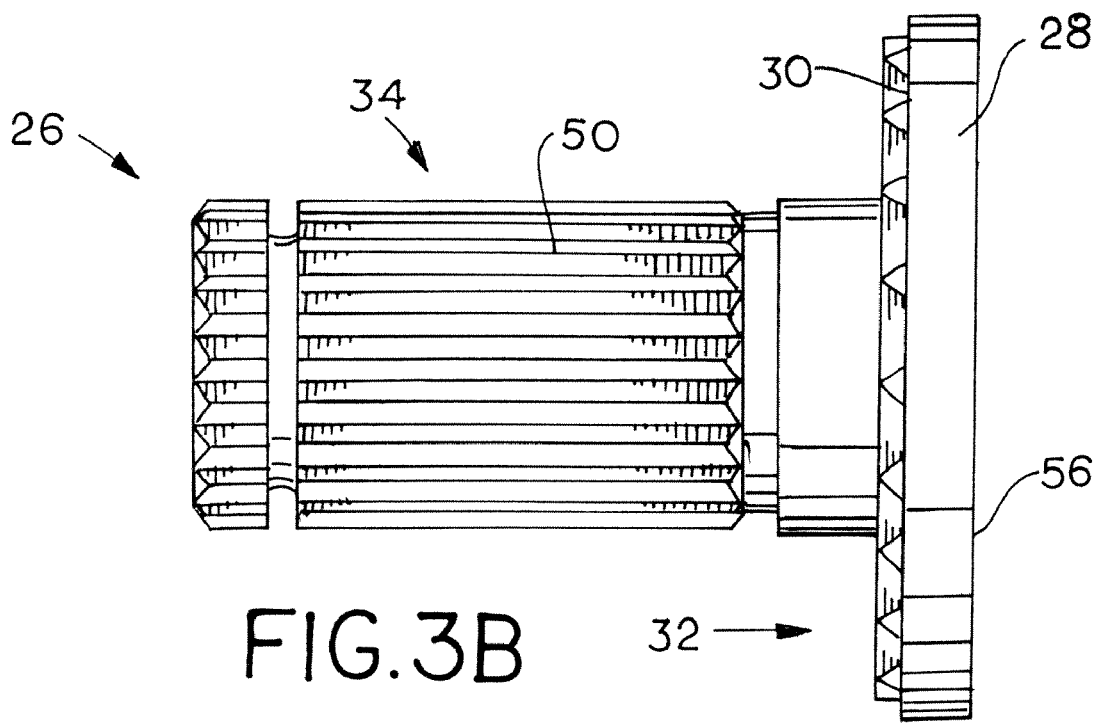
FIG. 3B is a side view of the clutch stub shaft of FIG. 3A.

As illustrated in FIG. 1B, the torque-limiting device assembly 10 may also include a resilient member 36 disposed within the bell interior 18. The resilient member 36 may be a Belleville spring, as shown in FIG. 1B. However, the resilient member 36 may be any type of spring capable of elastic deformation when axially compressed, such as a wave spring. The resilient member 36 may be secured to the bell 12 by a retaining ring 52 disposed within a circumferential groove 54 formed in the inner surface 42 of the side wall 16 of the bell 12. The resilient member 36 may be disposed between the retaining ring 52 and a bottom surface 56 of the clutch flange 28 such that the resilient member 36 biases the plurality of engagement protrusions 48 disposed on the top surface 30 of the clutch flange 28 into frictional engagement with the plurality of engagement grooves 44 disposed on the inner surface 24 of the top wall 14 of the bell 12 when the array of engagement protrusions 48 aligns with the array of engagement grooves 44.

As illustrated in FIGS. 1B, and 4A to 4C, the torque-limiting device assembly 10 may also include a flexible coupling assembly 58 disposed within the interior 18 of the bell 12. The flexible coupling assembly 58 may include an annular shaft hub 60 having an outer diameter 61 that is smaller than the diameter of the cylindrical inner surface 42 of the bell 12. The shaft hub 60 may have a central shaft aperture 62, and the shaft aperture 62 may have a splined surface 64 that is adapted to be rotationally coupled to an output shaft (not shown). Alternatively, the central shaft aperture 62 may be keyed or otherwise adapted to be rotationally coupled to the output shaft. The shaft hub 60 may also have a plurality of radially-arrayed ball pockets 66, as shown in FIG. 4D. Each ball pocket 66 may have a partial-circular shape configured to receive one of a plurality of balls 68 such that each of the halls 68 cannot be circumferentially displaced relative to the shaft hub 60. Each ball pocket 66, and each ball 68 received in each ball pocket 66, is positioned to correspond to one of the plurality of longitudinal slots 40 formed in the inner surface 42 of the side wall 16 of the bell 12. A ball retainer 70 may surround the shaft hub 60 to maintain each of the plurality of halls 68 within one of the ball pockets 66 of the shaft hub 60. The ball retainer 70 may include an annular first ring 72 having a beveled outer surface 74, and a maximum outer diameter of the first ring may be approximately equal to the diameter of the cylindrical inner surface 42 of the bell 12. A minimum inner diameter of the first ring 72 may be less than the outer diameter 61 of the shaft hub 60. The ball retainer 70 may also include a generally curved side wall 76 having a plurality of ball windows 78 formed in the side wall 76, wherein each ball window 78 corresponds to one of the plurality of balls 68 disposed within one of the ball pockets 66. Each ball window 78 secures one of the plurality of balls 68 within one of the ball pockets 66 of the shaft hub 60 while allowing each of the balls 68 to be received into one of the longitudinal slots 40 on the inner surface 42 of the bell 12. The side wall 76 may curve radially inward, and an inner diameter of the side wall 76 at a point farthest from the first ring 72 may be less than the outer diameter 61 of the shaft hub 60. Because the inner diameter of the side wall 76 at a point farthest from the first ring 72 may be less than the outer diameter 61 of the shaft hub 60, and the minimum inner diameter of the first ring 72 may be less than the outer diameter 61 of the shaft hub 60, the shaft hub 60 may be secured within the ball retainer 70 such that the flexible coupling assembly 58 is longitudinally displaceable within the interior 18 of the bell 12. The flexible coupling assembly 58 may also be angularly displaceable within the interior 18 of the bell 12. Specifically, a longitudinal axis 80 of the flexible coupling assembly 58 may be generally co-linear with a longitudinal axis 82 of the bell 12. However, because a rounded surface of each of the plurality of balls 68 engages a surface defining the longitudinal slots 40 in the interior 18 of the bell 12, the flexible coupling assembly 58 may rotate relative to the bell 12 such that an angle $\phi$ may be formed between the longitudinal axis 80 of the flexible coupling assembly 58 and the longitudinal axis 82 of the bell 12, as illustrated in FIG. 4E. Accordingly, a longitudinal axis 80 of the output shaft coupled to the flexible coupling assembly 58 may form an angle $\phi$ with a longitudinal axis 82 of the input shaft coupled to the stem 34 of the clutch stub shaft 26.

When it is desired to rotatably couple an input shaft (not shown) to an output shaft (not shown) using the torque-limiting device assembly 10, the input shaft may be coupled to the stem 34 of the clutch stub shaft 26 using any of several methods well-known in the art. For example, the splined exterior surface 50 of the stem 34 may be inserted into a shaft coupling (not shown) having a splined interior surface (not shown) that engages the splined exterior surface 50. When the input shaft rotates, the input shaft may transfer torque from the input shaft to the stem 34, causing the clutch stub shaft 26 to rotate. As the clutch stub shaft 26 rotates, the second engagement features 32, such as the plurality of engagement protrusions 48, may frictionally engage the first engagement features 22, such as the plurality of engagement grooves 44, and the input torque may be transferred from the clutch stub shaft 26 to the bell 12. Consequently, the bell 12 may rotate at a angular velocity equal to that of the input shaft. Because each of the plurality of balls 68 may be disposed in one of the longitudinal slots 40 formed in the interior surface 42 of the bell 12, the flexible coupling assembly 58 may rotate at an angular velocity equal to that of the bell 12. The output shaft (not shown) may be inserted in the shaft aperture 62 of the shaft hub 60 such that the rotation of the flexible coupling assembly 58 causes the output shaft to rotate at the same angular velocity as that of the bell 12. Accordingly, the angular velocities of the input shaft and the output shaft are equal.

Figure 5A:
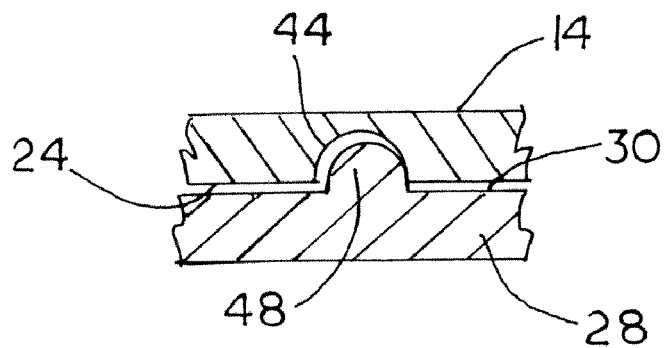
FIG. 5A is a sectional side view of the engagement of an engagement protrusion and an engagement groove of the first embodiment of the torque-limiting device assembly.
Figure 5B:
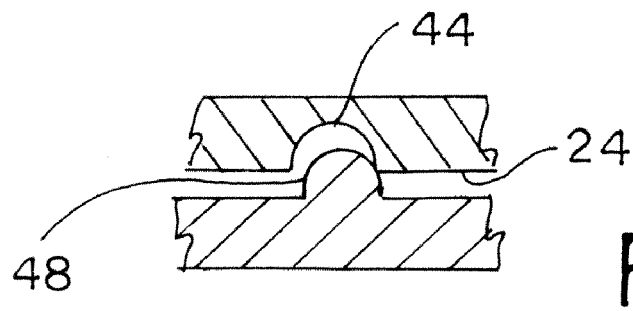
FIG. 5B is a sectional side view of the engagement of the engagement protrusion and the engagement groove of FIG. 5A.
Figure 5C:
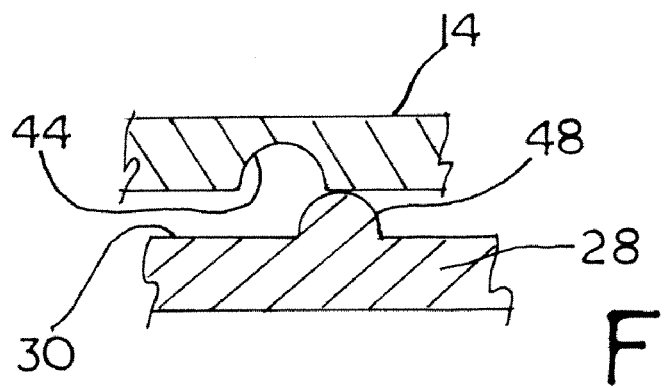
FIG. 5C is a sectional side view of the engagement of the engagement protrusion and the engagement groove of FIG. 5A.
Figure 5D:
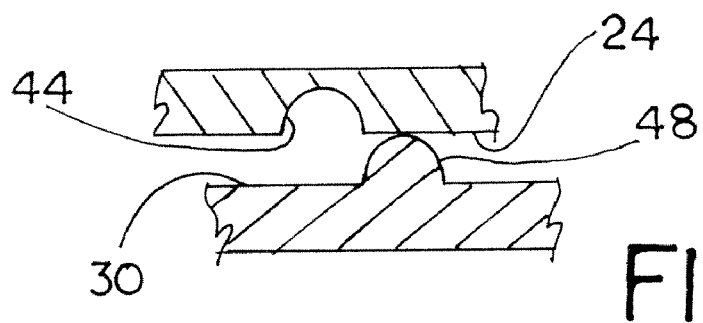
FIG. 5D is a sectional side view of the engagement of the engagement protrusion and the engagement groove of FIG. 5A.

If the rotational velocity of the output shaft is reduced (or increased) relative to the rotational velocity of the input shaft, a relative torque develops between the second engagement features 32 on the top surface 30 of the clutch flange 28 and the first engagement features 22 of the inner surface 24 of the top wall 14 of the bell 12. If the relative torque is greater than a predetermined torque value, the second engagement features 32 disengage from the first engagement features 22, and the input shaft is allowed to rotate relative to the output shaft. Specifically, when the relative torque is greater than a predetermined torque value, the plurality of engagement protrusions 48 of the clutch flange 28 may begin to rotate relative to the plurality of the engagement grooves 44 of the bell 16, as shown in FIG. 5A. As the engagement protrusions 48 reach an edge of the engagement grooves 44, the engagement protrusions 48, and the entire clutch stub shaft 26 that is biased towards the inner surface 24 of the top wall 14 of the bell 18, may be longitudinally displaced away from the inner surface 24, as illustrated in FIG. 5B. As the plurality of engagement protrusions 48 rotate relative to the plurality of the engagement grooves 44, a center of each engagement protrusion 48 reaches the edge of each engagement groove 44, as shown in FIG. 5C. The engagement protrusion 48 may then completely disengage from the engagement groove 44, and the center of each engagement protrusion 48 may begin to slidingly engage the inner surface 24 of the top wall 14, as shown in FIG. 5D. The plurality of engagement protrusions 48 of the clutch flange 28 may continue to rotate relative to the plurality of the engagement grooves 44 of the bell 16 until each engagement protrusion 48 engages a next engagement groove 44. If the relative torque between engagement protrusions 48 and the engagement grooves 44 continues to be greater than a predetermined torque value, the engagement protrusions 48 may again disengage from the engagement grooves 44 as previously described, thus allowing the input shaft to rotate relative to the output shaft such that the torque is not transferred from the input shaft to the output shaft.

One having ordinary skill in the art would recognize that the predetermined maximum torque valve explained above may be changed by adjusting one, or all, of several variables. These variables may include, for example, the spring force of the resilient member 36, the shape of each of the engagement grooves 44 and engagement protrusions 48, and the number of engagement grooves 44 and engagement protrusions 48. One having ordinary skill in the art would also recognize that the first engagement features 22 may be engagement protrusions 48 and the second engagement features 32 may be engagement grooves 44. Finally, one having ordinary skill in the art would recognize that the first engagement features 22 and the second engagement features 32 may be any frictional engagement mechanism that allows for torque transmission up to a predetermined maximum torque valve. For example, the first engagement features 22 may be a plurality of radially-disposed dome depressions (not shown) formed on the inner surface 24 of the top wall 14 of the bell 12, and the second engagement features 32 may be a plurality of radially-disposed dome projections (not shown) formed on the top surface 30 of the clutch flange 32, wherein each of the plurality of dome projections is configured to be received into one of the plurality of dome depressions. Alternatively, the first engagement features 22 may be a plurality of radially-disposed dome projections, and the second engagement features 32 may be a plurality of radially-disposed dome depressions.

In a second embodiment, illustrated in FIG. 6A, a torque-limiting device assembly 100 may include a bell 110 having a top wall 112 and a circumferential side wall 114 defining a bell interior 116. A stem aperture 118 may be formed in the top wall 112 and a plurality of longitudinal slots 120 may be formed on an inner surface 122 of the side wall 114. The a torque-limiting device assembly 100 may also include a clutch stub shaft assembly 124 including a clutch hub 126 having a top surface 128, a bottom surface 130, and a circumferential side surface 132. The side surface 132 may have a plurality of radially disposed pin recesses 134. A stem 135 may extend axially from the top surface 128 of the clutch hub 126, and the stem may be adapted to engage an shaft output shaft (not shown). A radial pin 138 may be disposed in each of the plurality of pin recesses 134. A resilient member 140 may be disposed in each of the plurality of pin recesses 134 between a bottom surface 142 of the pin recess and a shoulder 144 of the radial pin 138 such that each of the plurality of resilient members 140 biases each of the plurality of radial pins 138 into mating engagement with one of the plurality of longitudinal slots 120 formed on the inner surface 122 of the side wall 114.

As shown in FIGS. 6A to 6C, and as explained above, the torque-limiting device assembly 100 may include a bell 110. The bell 110 may be cylindrical in shape, and may include a top wall 112 located proximate to a first end 146 of the bell 110. The top wall 112 may be substantially planar, or may have the general shape of a dome. A stem aperture 118 may be located at the center of the top wall 112, and the stem aperture 118 may be dimensioned to receive a stem 135 of a clutch stub shaft assembly 124. A circumferential side wall 114 may extend longitudinally from the periphery of the top wall 112, and the side wall 114 may define an open second end 148 of the bell 110 that is opposite the first end 146. A bell interior 116 may be partially defined by an inner surface 122 of the side wall 114 and an inner surface 136 of the top wall 112. A plurality of longitudinal slots 120 may be formed on the inner surface 122 of the side wall 114, and each of the plurality of longitudinal slots 120 may extend from a first point proximate to the first end 146 of the bell 110 to a point proximate to the second end 148 of the bell 110.

As illustrated in FIGS. 6A, 8, 9A and 9B, the torque-limiting device assembly 100 may also include a clutch stub shaft assembly 124 at least partially disposed within the bell interior 116. As explained above, the clutch stub shaft assembly 124 may include a clutch hub 126. The clutch huh 126 may have a generally circular shape, and an outer diameter of the clutch hub 126 may be less than the diameter of the cylindrical inner surface 122 of the side surface 132. The clutch hub 126 may have a top surface 128 and a bottom surface 130, and a circumferential side surface 132 may extend from the top surface 128 to the bottom surface 130. A plurality of pin recesses 134 may be formed in the side wall 114 and each of the plurality of pin recesses 134 may have the general shape of a cylinder that is defined by a recess wall 152 and a bottom surface 142. The plurality of pin recesses 134 may be symmetrically arrayed such that a longitudinal axis of each of the cylindrical pin recesses 134 is directed radially inward, and an equal angular distance may separate the longitudinal axis of each pin recess 134. A stem 135 may axially extend from the top surface 128 of the clutch hub 126. The stem 135 may have a splined exterior surface 154 that is adapted to be rotationally coupled to an input shaft (not shown). Alternatively, the stem may be keyed or otherwise adapted to be rotationally coupled to the shaft input shaft. In operation, the clutch stub shaft assembly 124 may be disposed within the bell interior 116 such that the stem 135 is received through the stem aperture 118 of the bell 110, and the top surface 128 of the clutch hub 126 is proximate to the inner surface 136 of the top wall 112 of the bell 110. The clutch stub shaft assembly 124 may be secured within the bell by a retaining ring 137 disposed in a circumferential groove formed in the stem 135.

Figure 8:
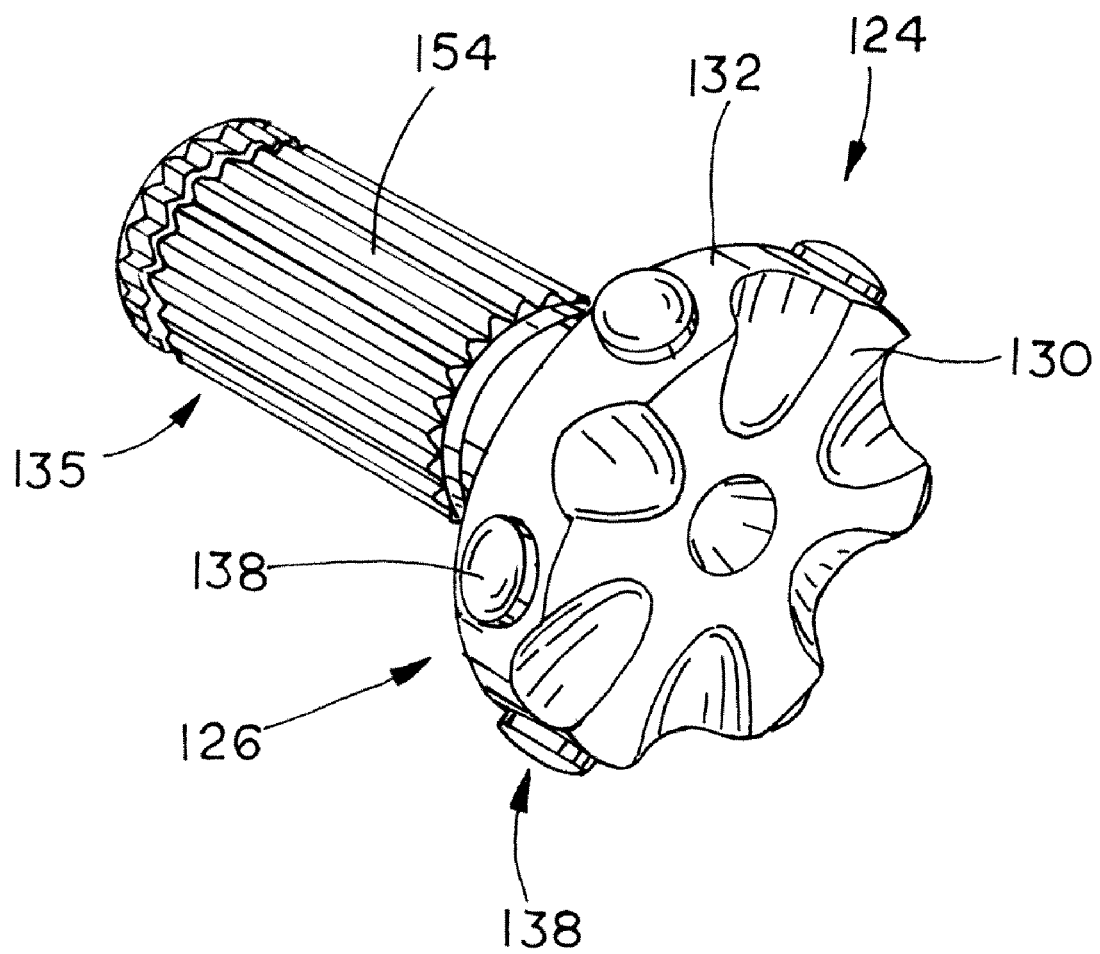
FIG. 8 is a perspective view of a clutch stub shaft assembly of the second embodiment of the torque-limiting device assembly.
Figure 9A:
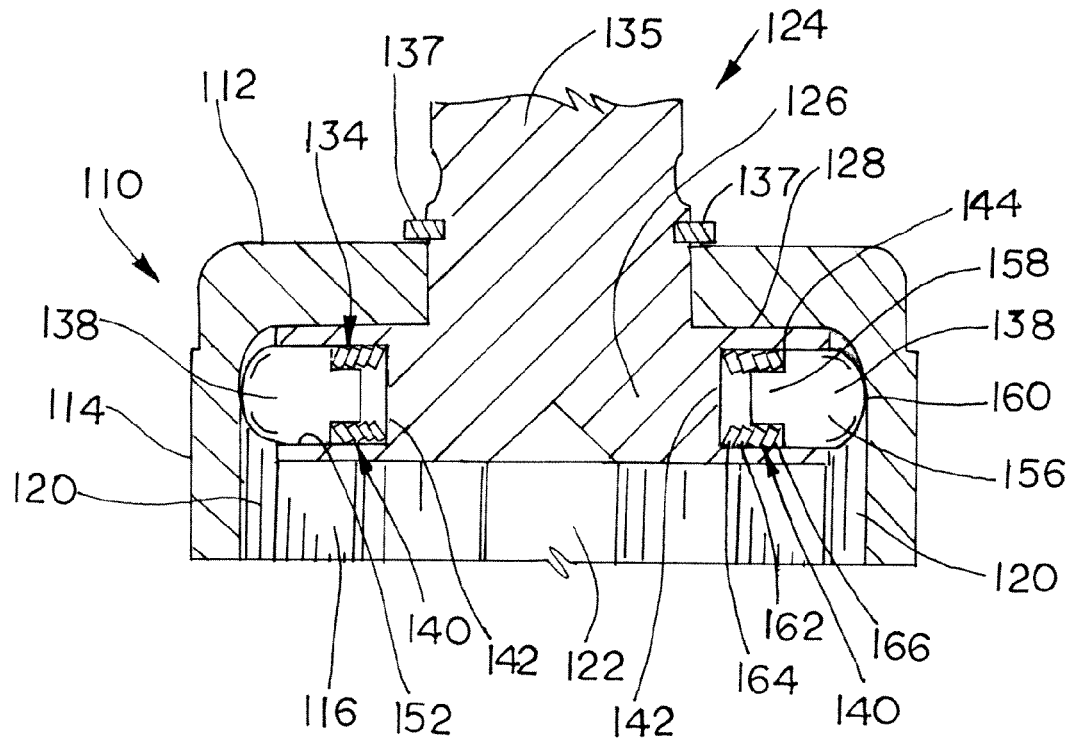
FIG. 9A is a sectional side view of the second embodiment of the torque-limiting device assembly.
Figure 9B:
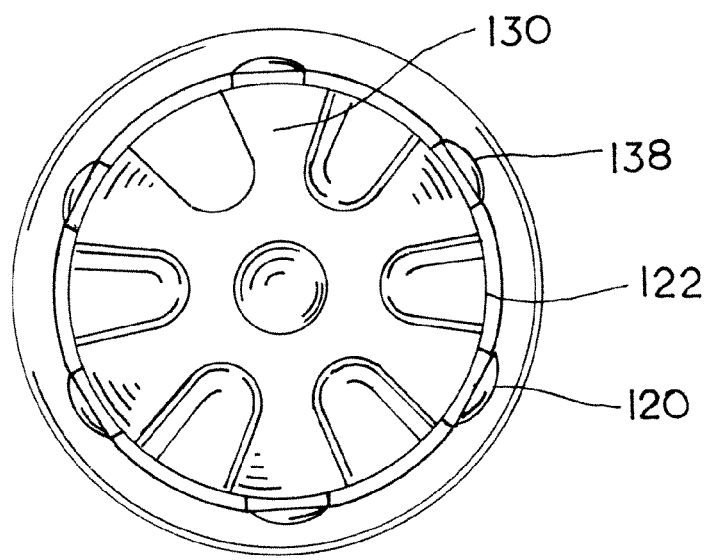
FIG. 9B is a bottom view of the second embodiment of the torque-limiting device assembly.

As shown in FIGS. 7B, 8, and 9A, the clutch stub shaft assembly 124 may also include a plurality of radial pins 138. As previously explained, each of the plurality of radial pins 138 may be disposed in one of the plurality of pin recesses 134 formed in the clutch hub 126. Each of the plurality of radial pins 138 may include an upper pin portion 156 and a lower pin portion 158. The lower pin portion 158 may have an outside diameter that is smaller than an outside diameter of the upper pin portion 156 such that a shoulder 144 is formed at the interface between the upper pin portion 156 and a lower pin portion 158. A dome-like engagement surface 160 may form the top surface of the upper pin portion 156. A resilient member 140, such as a plurality of stacked Belleville springs 162 illustrated in FIG. 7C, may be disposed within each of the pin recesses 134. For example, the plurality of stacked Belleville springs 162 may have a first end 164 that engages a portion of the bottom surface 142 of each of the pin recesses 134, and a second end 166 that engages a portion of the shoulder 144 such that each of the radial pins 138 is outwardly biased into engagement with one of the plurality of longitudinal slots 120 of the bell 110 when the clutch stub shaft assembly 124 is disposed within the bell interior 116.

The torque-limiting device assembly 100 may also include the flexible coupling assembly 58 described above. The flexible coupling assembly 58 may be disposed within the bell interior 116, and each of the plurality of balls 68 may engage one of the plurality of longitudinal slots 120 of the bell 110. The flexible coupling assembly 58 of the current embodiment of the torque-limiting device assembly 100 may operate in an identical manner to the torque-limiting device assembly 10 previously described. Accordingly, the flexible coupling assembly 58 has been omitted from FIGS. 6A to 10D.

When it is desired to rotatably couple an input shaft (not shown) to an output shaft (not shown) using the torque-limiting device assembly 100, the input shaft may be coupled to the stem 135 of the clutch stub shaft assembly 124 using any of several methods well-known in the art. For example, the splined exterior surface 154 of the stem 135 may be inserted into a shaft coupling (not shown) having a splined interior surface (not shown) that engages the splined exterior surface 154. When the input shaft rotates, the input shaft may transfer torque from the input shaft to the stem 135, causing the clutch stub shaft assembly 124 to rotate. As the clutch stub shaft assembly 124 rotates, each of the outwardly-biased radial pins 138 may frictionally engage one of the plurality of longitudinal slots 120 and the input torque may be transferred from the clutch stub shaft assembly 124 to the bell 110. Consequently, the bell 110 may rotate at a angular velocity equal to that of the input shaft. Because each of the plurality of balls 68 of the flexible coupling assembly 58 (illustrated in FIGS. 4A to 4D) may be disposed in one of the longitudinal slots 120 of the bell 110, the flexible coupling assembly 58 may rotate at an angular velocity equal to that of the bell 110. The output shaft (not shown) may be inserted in the shaft aperture 62 of the shaft hub 60 such that the rotation of the flexible coupling assembly 58 causes the output shaft to rotate at the same angular velocity as that of the bell 110. Accordingly, the angular velocities of the input shaft and the output shaft may be equal.

Figure 10A:
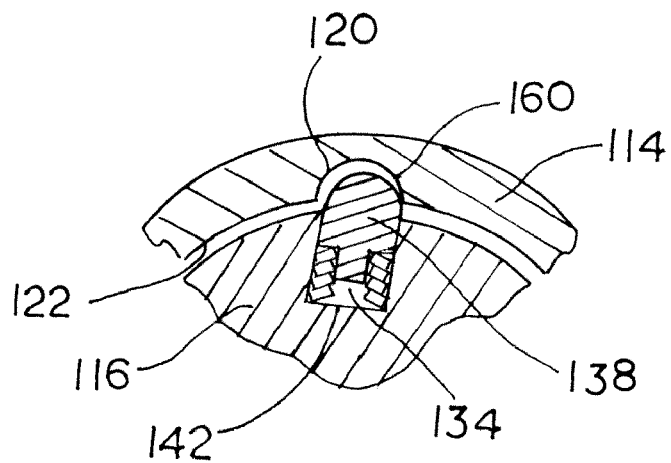
FIG. 10A is a sectional top view of the engagement of a longitudinal slot and a radial pin of the second embodiment of the torque-limiting device assembly.
Figure 10B:
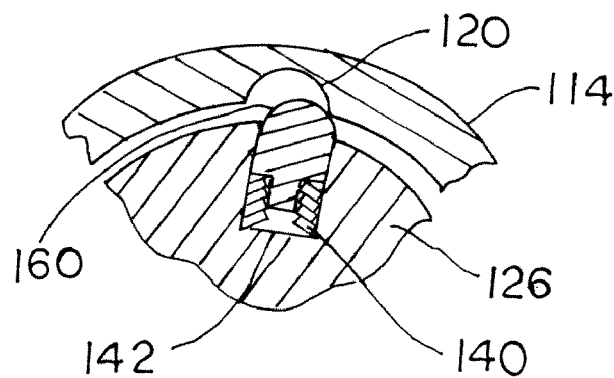
FIG. 10B is a sectional top view of the engagement of the longitudinal slot and the radial pin of FIG. 10A.
Figure 10C:
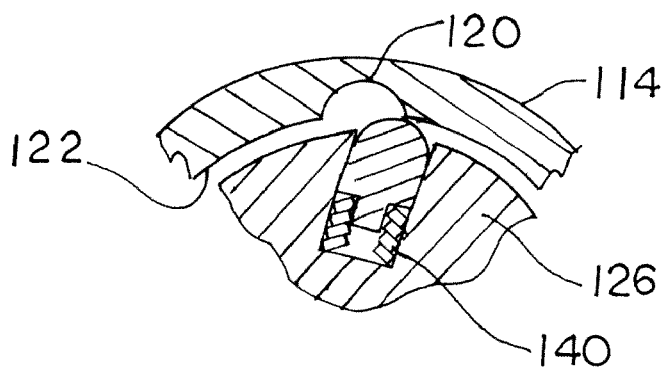
FIG. 10C is a sectional top view of the engagement of the longitudinal slot and the radial pin of FIG. 10A.
Figure 10D:
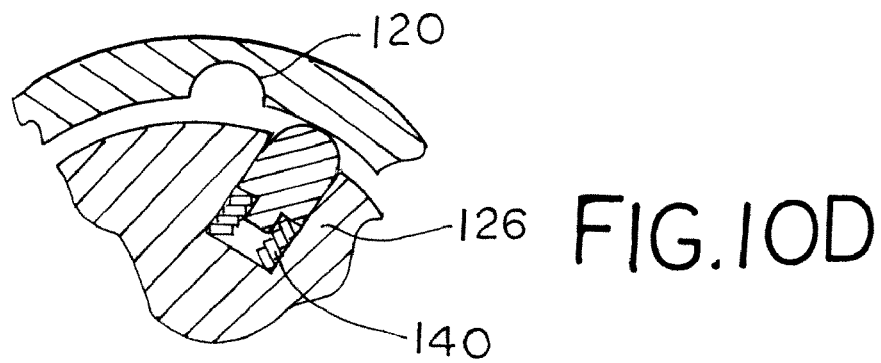
FIG. 10D is a sectional top view of the engagement of the longitudinal slot and the radial pin of FIG. 10A.

If the rotational velocity of the output shaft is reduced (or increased) relative to the rotational velocity of the input shaft, a relative torque develops between the engagement surface 160 of each of the plurality of radial pins 138 and a surface of the longitudinal slots 120 of the bell 12. If the relative torque is greater than a predetermined torque value, each of the plurality of radial pins 138 may disengage from the longitudinal slots 120, and the input shaft may be allowed to rotate relative to the output shaft. Specifically, when the relative torque is greater than a predetermined torque value, the plurality of radial pins 138 may rotate relative to the plurality of longitudinal slots 120, as shown in FIG. 10A. As each radial pin 138 reaches an edge of the longitudinal slot 120, the radial pin 138 may be axially displaced towards the bottom surface 142 of the pin recess 134, as illustrated in FIG. 10B. As the plurality of radial pins 138 continue to rotate relative to the longitudinal slots 120, a center of each radial pin 138 may reach an edge of each of the longitudinal slot 120, as shown in FIG. 10C. Each radial pins 138 may then completely disengages from each longitudinal slot 120, and each radial pin 138 may begin to slidingly engage the inner surface 122 of the side wall 114 of the bell 110, as shown in FIG. 10D. The plurality of radial pins 138 of the clutch stub shaft assembly 124 may continue to rotate relative to the plurality of longitudinal slots 120 of the bell 16 until each radial pin 138 engages a next longitudinal slots 120. If the relative torque between the radial pin 138 and the next longitudinal slot 120 continues to be greater than a predetermined torque value, the radial pin 138 will again disengage from the next longitudinal slot 120 as previously described, thus allowing the input shaft to rotate relative to the output shaft.

One having ordinary skill in the art would recognize that the predetermined maximum torque valve explained above may be changed by adjusting one, or all, of several variables. These variables may include, for example, the spring force of the resilient member 36, the shape of the each of the radial pins 138 and the longitudinal slots 120, and the number of radial pins 138 and longitudinal slots 120.

Figure 11A:
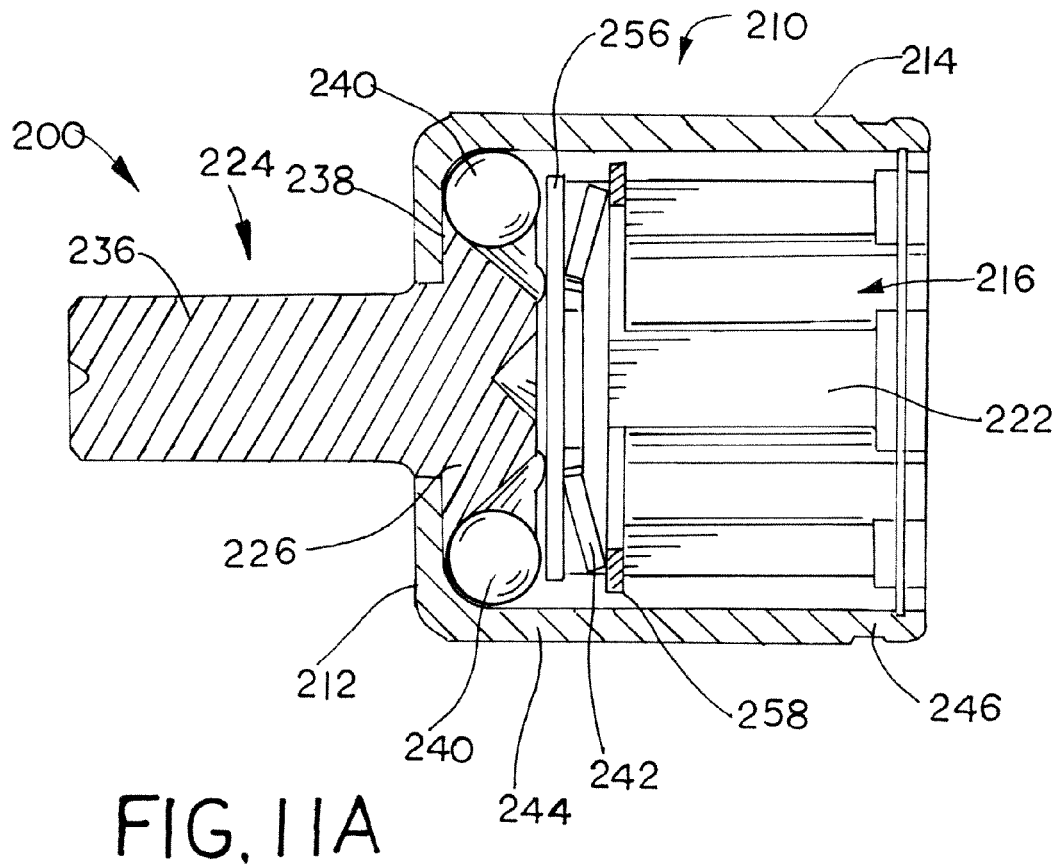
FIG. 11A is a sectional side view of a third embodiment of the torque-limiting device assembly.

In a third embodiment, illustrated in FIG. 11A, a torque-limiting device assembly 200 may include a bell 210 having a top wall 212 and a circumferential side wall 214 defining a bell interior 216. A stem aperture 218 may be formed in the top wall 212 and a plurality of longitudinal slots 220 may be formed on an inner surface 222 of the side wall 214. The torque-limiting device assembly 200 may also include a clutch stub shaft 224 including a clutch hub 226 having a top surface 228, a bottom surface 230 and a circumferential side surface 232. A plurality of oblique channels 234 may be formed in the clutch hub 226, and the oblique channels 234 may intersect the side surface 232 and the bottom surface 230 of the clutch hub 226. A stem 236 may extend axially from the top surface 228 of the clutch hub 226. The clutch stub shaft 224 may be sized to be received into the bell 210 such that the stem 236 may extend through the stem aperture 218 of the top wall 212 of the bell 210 and an inner surface 238 of the top wall 212 of the bell 210 may be proximate to the top surface 228 of the clutch hub 226. One of a plurality of clutch balls 240 may be disposed in each of the oblique channels 234. A resilient member 242 may be secured to the bell 210 and may engage each of the plurality of balls 240 such that the resilient member 242 biases each of the plurality of balls 240 into mating engagement with one of the plurality of longitudinal slots 220 formed in the bell 210.

Figure 11B:
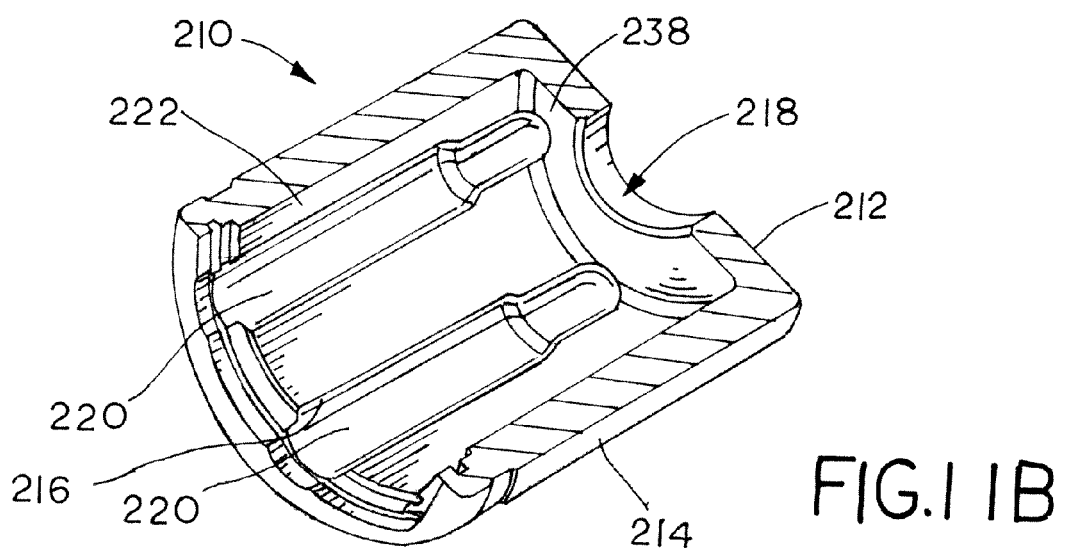
FIG. 11B is a perspective sectional view of a bell of the third embodiment of the torque-limiting device assembly.

As shown in FIGS. 11A and 11B, and as explained above, the torque-limiting device assembly 200 may include a bell 210. The bell 210 may be cylindrical in shape, and may include a top wall 212 located proximate to a first end 244 of the bell 112. The top wall 212 may be substantially planar, or may have the general shape of a dome. A stem aperture 218 may be located at the center of the top wall 212, and the stem aperture 218 may be dimensioned to receive a stem 236 of a clutch stub shaft 224. A circumferential side wall 214 may extend longitudinally from the periphery of the top wall 212, and the side wall 214 may define an open second end 246 of the bell 210 that is opposite the first end 146. A bell interior 216 may be partially defined by an inner surface 222 of the side wall 214 and an inner surface 238 of the top wall 212. A plurality of longitudinal slots 220 may be formed on the inner surface 222 of the side wall 214, and each of the plurality of longitudinal slots 220 may extend from a first point proximate to the first end 244 of the bell 210 to a point proximate to the second end 246 of the bell 210.

As illustrated in FIGS. 11A, 12A, and 12B, the torque-limiting device assembly 200 may also include a clutch stub shaft 224 at least partially disposed within the bell interior 216. As explained above, the clutch stub shaft 224 may include a clutch hub 226. The clutch hub 226 may have a generally circular shape, and an outer diameter of the clutch huh 226 may be less than a diameter of the cylindrical inner surface 222 of the side wall 214. The clutch hub 226 may have a top surface 228 and a bottom surface 230, and a circumferential side surface 232 may extend from the top surface 228 to the bottom surface 230. A plurality of oblique channels 234 may be formed in the clutch hub 226 between the side surface 232 and the bottom surface 230. Each of the plurality of oblique channels 234 may have the general shape of a partial cylinder, and a longitudinal axis 248 of each of the oblique channels 234 may intersect a longitudinal axis 250 of the clutch stub shaft 224 such that an acute angle α is formed, as shown in FIG. 12C. The plurality of oblique channels 234 may be symmetrically arrayed such that an equal angular distance may separate the longitudinal axis 248 of each oblique channels 234. A stem 236 may axially extend from the top surface 228 of the clutch hub 226. The stem 236 may have a splined exterior surface 252 that is adapted to be rotationally coupled to an input shaft (not shown). Alternatively, the stem 236 may be keyed or otherwise adapted to be rotationally coupled to the shaft input shaft.

Figure 13A:
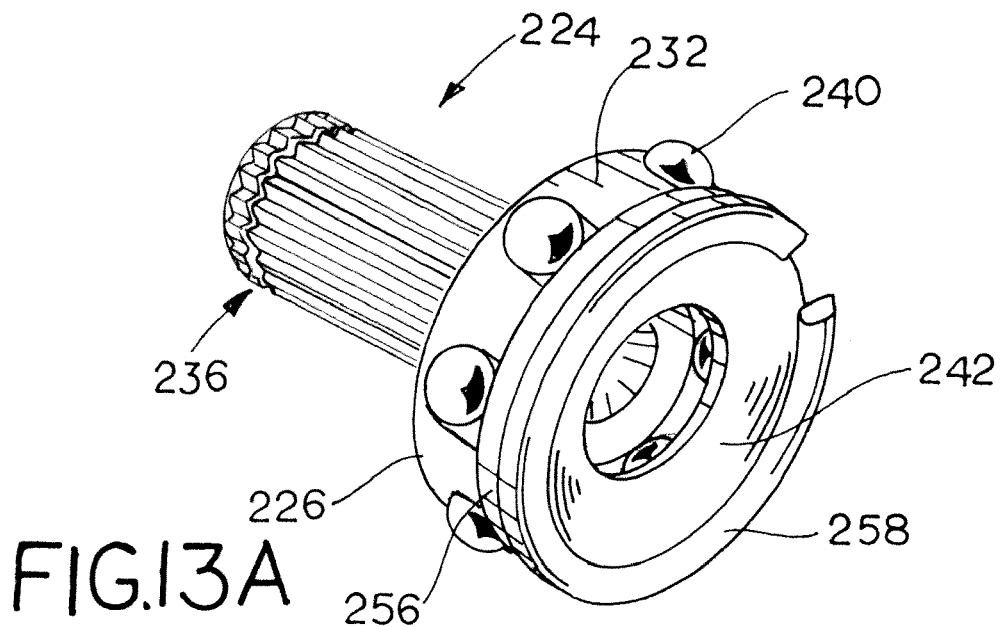
FIG. 13A is a perspective view of the clutch stub shaft, a resilient member, and a plurality of clutch balls of the third embodiment of the torque-limiting device assembly.
Figures 13B, 13C:
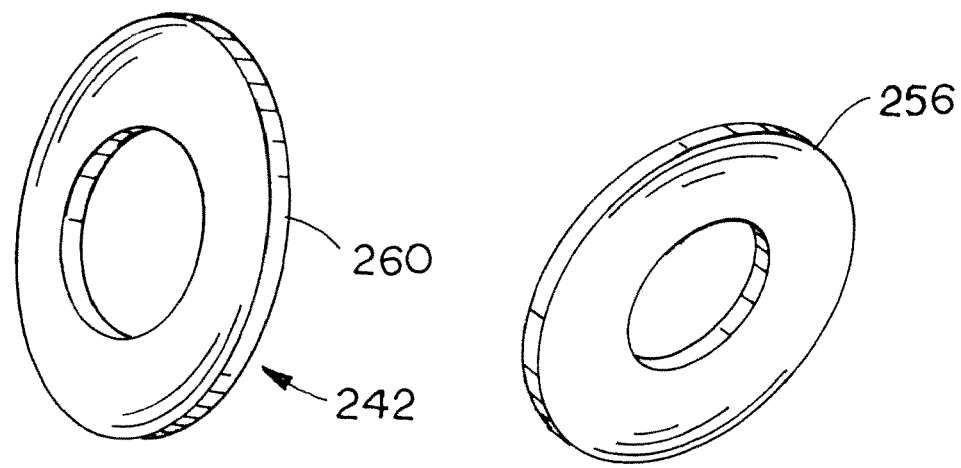
FIG. 13B is a perspective view of the resilient member of the third embodiment of the torque-limiting device assembly.
FIG. 13C is a perspective view of retaining plate of the third embodiment of the torque-limiting device assembly.

As illustrated in FIGS. 11A and 13A, the torque-limiting device assembly 200 may also include a plurality of clutch balls 240, and each of the plurality of clutch balls 240 may be disposed within one of the oblique channels 234. The plurality of clutch balls 240 may be maintained in the plurality of oblique channels 234 by an annular retaining plate 256. The retaining plate 256 may itself be maintained in position by a resilient member 242 that may be secured to the bell 210 by a retaining ring 258 disposed within a circumferential groove formed in the inner surface 222 of the side wall 214 of the bell 210. The resilient member 242 may be a Belleville spring 260, as illustrated in FIGS. 11A, 13A, and 13B, or may be any type of spring capable of elastic deformation when axially compressed, such as a wave spring. The resilient member 242 may bias the retaining plate 256 towards the top wall 212 of the bell 210, thus forcing each of the plurality of clutch balls 240 in the plurality of oblique channels 234 towards the side wall 214 such that each of the clutch balls 240 is received into one of the plurality of longitudinal slots 220 formed in the inner surface 222 of the sidewall 214.

The torque-limiting device assembly 200 may also include the flexible coupling assembly 58 previously described. The flexible coupling assembly 58 may be disposed within the bell interior 216, and each of the plurality of balls 68 may engage one of the plurality of longitudinal slots 220 of the bell 210. The flexible coupling assembly 58 of the current embodiment of the torque-limiting device assembly 200 may operate in an identical manner to the torque-limiting device assembly 10 previously described. Accordingly, the flexible coupling assembly 58 has been omitted from FIGS. 11A-14D.

When it is desired to rotatably couple an input shaft (not shown) to an output shaft (not shown) using the torque-limiting device assembly 200, the input shaft may be coupled to the stem 236 of the clutch stub shaft 234 using any of several methods well-known in the art. For example, the splined exterior surface 252 of the stem 135 may be inserted into a shaft coupling (not shown) having a splined interior surface (not shown) that engages the splined exterior surface 252. When the input shaft rotates, the input shaft may transfer torque from the input shaft to the stem 236, causing the clutch stub shaft 224 to rotate. As the clutch stub shaft assembly 124 rotates, each of the outwardly-biased clutch balls 240 may frictionally engage one of the plurality of longitudinal slots 220, thereby transferring the input torque from the clutch stub shaft 224 to the bell 210. Consequently, the bell 210 may rotate at a angular velocity equal to that of the input shaft. Because each of the plurality of balls 68 of the flexible coupling assembly 58 (as shown in FIGS. 4A to 4D) may be disposed in one of the longitudinal slots 220 of the bell 210, the flexible coupling assembly 58 may rotate at an angular velocity equal to that of the bell 210. The output shaft (not shown) may be inserted in the shaft aperture 62 of the shaft hub 60 such that the rotation of the flexible coupling assembly 58 causes the output shaft to rotate at the same angular velocity as that of the bell 210. Accordingly, the angular velocities of the input shaft and the output shaft may be equal.

Figure 14A:
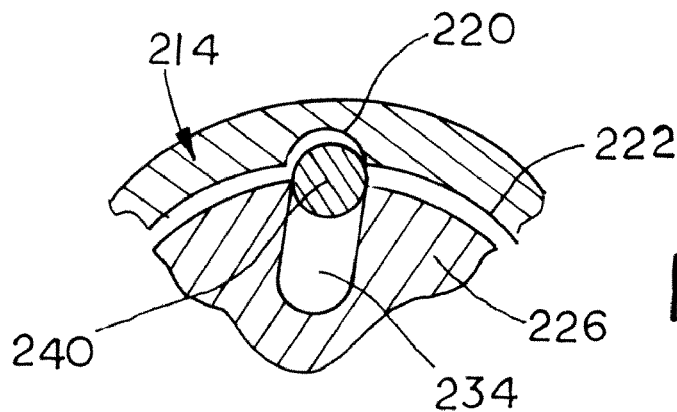
FIG. 14A is a sectional top view of the engagement of a longitudinal slot and a radial pin of the second embodiment of the torque-limiting device assembly.
Figure 14B:
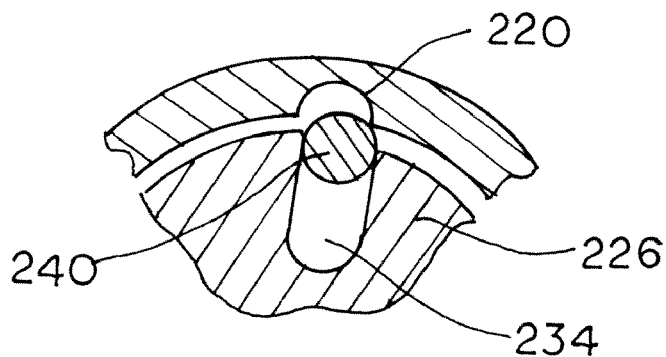
FIG. 14B is a sectional top view of the engagement of the longitudinal slot and the radial pin of FIG. 14A.
Figure 14C:
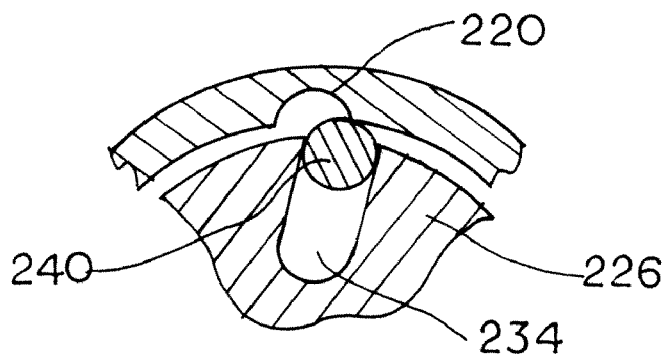
FIG. 14C is a sectional top view of the engagement of the longitudinal slot and the radial pin of FIG. 14A.
Figure 14D:
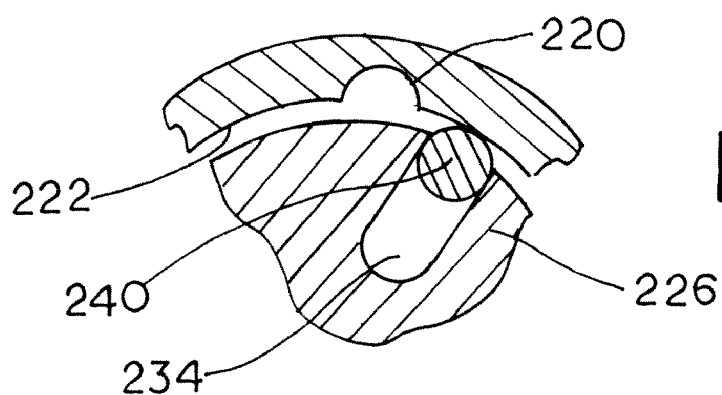
FIG. 14D is a sectional top view of the engagement of the longitudinal slot and the radial pin of FIG. 14A.

If the rotational velocity of the output shaft is reduced (or increased) relative to the rotational velocity of the input shaft, a relative torque develops between a contact surface of each of the plurality of clutch balls 240 and a surface of the longitudinal slots 220 of the bell 210. If the relative torque is greater than a predetermined torque value, each of the plurality of clutch balls 240 may disengage from the longitudinal slots 220, and the input shaft may be allowed to rotate relative to the output shaft. Specifically, when the relative torque is greater than a predetermined torque value, the plurality of clutch balls 240 may rotate relative to the plurality of longitudinal slots 220, as shown in FIG. 14A. As each clutch ball 240 reaches an edge of the longitudinal slot 220, each clutch ball 240 may be axially displaced within the oblique channel 234 towards the longitudinal axis 250 of the clutch stub shaft 224, as illustrated in FIG. 14B. Because the oblique channel 234 is also oriented towards the resilient member 242, the displacement of the plurality of clutch balls 240 within the oblique channels 234 causes the retaining plate 156 to compress the resilient member 242. As the plurality of clutch balls 240 continue to rotate relative to the longitudinal slots 220, a center of each clutch ball 240 reaches an edge of each longitudinal slot 220, as shown in FIG. 14C. Each clutch ball 240 may then completely disengage from each longitudinal slot 220, and each clutch ball 240 may begin to slidingly engage the inner surface 222 of the side wall 214 of the bell 210, as shown in FIG. 14D. The plurality of clutch balls 240 of the clutch stub shaft 224 may continue to rotate relative to the plurality of longitudinal slots 220 of the bell 210 until each clutch ball 240 is forced into engagement with a next longitudinal slot 220 by the resilient member 242 acting on the plurality of clutch balls 240. If the relative torque between the clutch balls 240 and the next longitudinal slot 220 continues to be greater than a predetermined torque value, the clutch balls 240 will again disengage from the next longitudinal slot 220 as previously described, thus allowing the input shaft to rotate relative to the output shaft.

As was the case with the previously discussed embodiments, one having ordinary skill in the art would recognize that the predetermined maximum torque valve explained above may be changed by adjusting one, or all, of several variables. These variables may include, for example, the spring force of the resilient member 242, the shape of the longitudinal slots 220, and the number of clutch balls 240 and longitudinal slots 220.

Those of skill in the art will readily understand that the teachings of the foregoing examples may be applied to a variety of vehicles, and may further be applicable to a variety of driveline applications. For example, the foregoing teachings may be used as a half-shaft in many vehicles, in which the shaft provides a driving connection between a differential and a drive wheel. Additionally, the foregoing teachings may be used in drive shaft applications in which the shaft provides a driving connection between, for example, an engine output shaft or transmission output shaft, and a differential. These shafts are typically called prop shafts in many countries.

While various embodiments have been described above, this disclosure is not intended to be limited thereto. Variations can be made to the disclosed embodiments that are still within the scope of the appended claims.

What is claimed is:

1. A torque-limiting device assembly comprising:
    a bell comprising a top wall and a circumferential side wall defining a bell interior, wherein the top wall is located proximate to a first end of the bell and the side wall defines an open second end of the bell, and wherein a stem aperture is formed in the top wall and a plurality of first engagement features are formed on an inner surface of the top wall;
    a clutch stub shaft comprising:
        a clutch flange having a top surface, the top surface comprising a plurality of second engagement features;
        a stem axially extending from the top surface of the clutch flange, the stem adapted to engage a shaft,
        wherein the clutch stub shaft is sized to be received into the bell interior such that the stem extends through the stem aperture of the top wall of the bell and the inner surface of the top wall of the bell is proximate to the top surface of the clutch flange; and
    a resilient member secured to the circumferential side wall defining the bell interior, the resilient member biasing the top surface of the clutch stub shaft towards the top wall of the bell such that the first engagement features of the bell frictionally engage the second engagement features of the clutch stub shaft,
    wherein a first input torque applied to the stem that is less than a predetermined input torque is transferred to the bell when the first engagement features of the bell frictionally engage the second engagement features of the stem clutch, and
    wherein a second input torque applied to the stem that is greater than the predetermined input torque causes the second engagement features of the stem clutch to disengage with the first engagement features of the bell such that the second input torque is not transferred to the bell.

2. The torque-limiting device assembly of claim 1, wherein the first engagement features are a plurality of radially-disposed slots formed on the inner surface of the top wall of the bell, and
    the second engagement features are a plurality of radially-disposed ridges formed on the top surface of the clutch flange, wherein each of the plurality of ridges is configured to be received into one of the plurality of slots.

3. The torque-limiting device assembly of claim 1, wherein the first engagement features are a plurality of radially disposed ridges formed on the inner surface of the top wall of the bell, and
    the second engagement features are a plurality of radially-disposed slots formed on the top surface of the clutch flange, wherein each of the plurality of ridges is configured to be received into one of the plurality of slots.

4. The torque-limiting device assembly of claim 1, wherein the first engagement features are a plurality of radially-disposed dome depressions formed on the inner surface of the top wall of the bell, and
    the second engagement features are a plurality of radially-disposed dome projections formed on the top surface of the clutch flange, wherein each of the plurality of dome projections is configured to be received into one of the plurality of dome depressions.

5. The torque-limiting device assembly of claim 1, wherein the first engagement features are a plurality of radially disposed dome projections formed on the inner surface of the top wall of the bell, and
    the second engagement features are a plurality of radially-disposed dome depressions formed on the top surface of the clutch flange, wherein each of the plurality of dome projections is configured to be received into one of the plurality of dome depressions.

6. The torque-limiting device assembly of claim 1, wherein the resilient member is a Belleville spring, wherein the Belleville spring is coupled to the bell by a retainer ring that is disposed in a circumferential slot formed on an interior surface of the bell.

7. The torque-limiting device assembly of claim 1, wherein a plurality of longitudinal slots are formed on an interior surface of the bell.

8. The torque-limiting device assembly of claim 7, further comprising a flexible coupling assembly, the flexible coupling assembly comprising:
    an annular shaft hub having a shaft aperture and a plurality of ball windows radially disposed about a longitudinal axis of the shaft hub;
    a plurality of balls, each of the balls being disposed within a corresponding ball window formed in the shaft hub; and
    a ball retainer coupled to the shaft hub, the ball retainer securing each of the plurality of balls within the corresponding ball window of the shaft hub,
    wherein each of the plurality of balls is slidingly disposed in one of the plurality of longitudinal slots formed on the interior surface of the bell such that the flexible coupling assembly is longitudinally displaceable relative to the bell and such that the longitudinal axis of the shaft hub is angularly displaceable relative to a longitudinal axis of the bell.

9. The torque-limiting device assembly of claim 1, wherein the resilient member is a wave spring.

10. The torque-limiting device assembly of claim 1, wherein the interior surface of the side wall of the bell has a circular cross-sectional shape, and the clutch flange has a circular cross sectional shape, and wherein the stem is cylindrical.

11. The torque-limiting device assembly of claim 1, wherein the stem is splined.

12. A torque-limiting device assembly comprising:
    a bell comprising a top wall, a circumferential side wall, and a stem aperture formed in the top wall, wherein an inner surface of the side wall and an inner surface of the top wall at least partially define a bell interior;
    a clutch stub shaft comprising:
        a clutch flange having a top surface;
        a stem axially extending from the top surface of the clutch flange, the stem adapted to engage a shaft,
        wherein the clutch stub shaft is sized to be received into the bell interior such that the stem extends through the stem aperture of the top wall of the bell and the inner surface of the top wall of the bell frictionally engages the top surface of the clutch flange; and
    a resilient member secured to the circumferential side wall defining the bell interior, the resilient member adapted to bias the top surface of the clutch stub shaft towards the inner surface of the top wall of the bell such that the inner surface of the top wall of the bell frictionally engages the top surface of the clutch flange,
    wherein a first input torque applied to the stem that is less than a predetermined input torque is transferred to the bell when the inner surface of the top wall of the bell frictionally engages the top surface of the clutch flange, and wherein a second input torque applied to the stem that is greater than the predetermined input torque causes the top surface of the clutch flange to disengage with the inner surface of the top wall of the bell such that the second input torque is not transferred to the bell.

13. The torque-limiting device assembly of claim 12, further comprising a plurality of radially-disposed slots formed on the inner surface of the top wall of the bell, and a plurality of radially-disposed ridges formed on the top surface of the clutch flange, wherein each of the plurality of ridges is configured to be received into one of the plurality of slots such that the plurality of ridges frictionally engages the plurality of slots.

14. The torque-limiting device assembly of claim 12, further comprising a flexible coupling assembly, the flexible coupling assembly comprising:

an annular shaft hub having a shaft aperture and a plurality of ball windows radially disposed about a longitudinal axis of the shaft hub;

a plurality of balls, each of the balls being disposed within a corresponding ball window formed in the shaft hub; and a ball retainer coupled to the shaft hub, the ball retainer securing each of the plurality of balls within the corresponding ball window of the shaft hub, wherein each of the plurality of balls is slidingly disposed in one of a plurality of longitudinal slots formed on the inner surface of the side wall of the bell such that the flexible coupling assembly is longitudinally displaceable relative to the bell and such that the longitudinal axis of the shaft hub is angularly displaceable relative to a longitudinal axis of the bell.

* * * * *